United States Patent
Alexiou et al.

(10) Patent No.: US 10,940,872 B2
(45) Date of Patent: Mar. 9, 2021

(54) TRANSDUCER SYSTEM PROVIDING TACTILE SENSATIONS

(71) Applicant: SUBPAC, INC., San Francisco, CA (US)

(72) Inventors: John Thomas Alexiou, Los Angeles, CA (US); Todd Christopher Chernecki, Palo Alto, CA (US); Sarosh Sultan Khwaja, Palo Alto, CA (US); James Andrew Kimpel, San Francisco, CA (US); Mark Elard Seeger, San Francisco, CA (US); Peter R. Williams, San Francisco, CA (US)

(73) Assignee: SUBPAC, INC., San Francisco, CA (US)

( * ) Notice: Subject to any disclaimer, the term of this patent is extended or adjusted under 35 U.S.C. 154(b) by 0 days.

(21) Appl. No.: 16/315,589

(22) PCT Filed: Aug. 4, 2017

(86) PCT No.: PCT/US2017/045572
§ 371 (c)(1),
(2) Date: Jan. 4, 2019

(87) PCT Pub. No.: WO2018/027168
PCT Pub. Date: Feb. 8, 2018

(65) Prior Publication Data
US 2019/0300020 A1    Oct. 3, 2019

Related U.S. Application Data

(60) Provisional application No. 62/371,599, filed on Aug. 5, 2016.

(51) Int. Cl.
*B60W 50/16* (2020.01)
*G06F 3/01* (2006.01)
(Continued)

(52) U.S. Cl.
CPC ............... *B60W 50/16* (2013.01); *B60Q 9/00* (2013.01); *G05B 9/00* (2013.01); *G06F 3/016* (2013.01); *H04R 1/2896* (2013.01); *H04R 3/04* (2013.01)

(58) Field of Classification Search
CPC ......... B60W 50/16; B60Q 9/00; B60Q 9/008; G05B 9/00; G06F 3/016; G08B 6/00;
(Continued)

(56) References Cited

U.S. PATENT DOCUMENTS 3,470,432 A    9/1969    Chubbuck
7,553,288 B2   6/2009    Cohen
(Continued)

FOREIGN PATENT DOCUMENTS

CN    101077040 A    11/2007
CN    101213867 A    7/2008
(Continued)

OTHER PUBLICATIONS

JP Office Action dated Jan. 7, 2020 as received in Application No. 2019-527782.
(Continued)

*Primary Examiner* — Hung T Nguyen
(74) *Attorney, Agent, or Firm* — Maschoff Brennan

(57) ABSTRACT

A system providing tactile sensations. The system comprises a seat back of a seat, the seat back having a left side and a right side separated by a center-line of the seat back. A first plurality of electroactive transducers are arranged along the center-line of the seat back and provide tactile sound to a user. A second plurality of electroactive transducers in the seat back provide tactile alerts or feedback. The second plurality of electroactive alert transducers comprise a left-
(Continued)

side electroactive transducer at the left side of the seat back and right-side electroactive transducer at the right side of the seat back.

13 Claims, 12 Drawing Sheets

(51) Int. Cl.
  *H04R 1/28* (2006.01)
  *H04R 3/04* (2006.01)
  *G05B 9/00* (2006.01)
  *B60Q 9/00* (2006.01)

(58) Field of Classification Search
  CPC .......... H04R 1/2896; H04R 3/04; H04R 9/06; H04R 9/00
  USPC ............... 340/407.1, 435, 436; 381/151, 396
  See application file for complete search history.

(56) References Cited

U.S. PATENT DOCUMENTS

| | | | |
|---|---|---|---|
| 8,339,285 B2 | 12/2012 | Boren et al. | |
| 8,942,892 B2* | 1/2015 | Veen | B60N 2/0276 701/49 |
| 9,004,589 B2 | 4/2015 | Rockwell et al. | |
| 9,123,215 B2 | 9/2015 | Kiefer et al. | |
| 9,866,960 B2 | 1/2018 | Hashimoto et al. | |
| 10,111,010 B2 | 10/2018 | Alexiou et al. | |
| 10,275,029 B2* | 4/2019 | Jones | G06F 3/016 |
| 2004/0049323 A1 | 3/2004 | Tijerina et al. | |
| 2007/0109104 A1* | 5/2007 | Altan | B60Q 9/008 340/407.1 |
| 2007/0135740 A1 | 6/2007 | Butler | |
| 2007/0217644 A1 | 9/2007 | Ledonne | |
| 2009/0295202 A1 | 12/2009 | Takada et al. | |
| 2010/0226508 A1 | 9/2010 | Aarts et al. | |
| 2011/0251535 A1 | 10/2011 | Bender | |
| 2013/0202134 A1* | 8/2013 | Afshar | H04R 9/06 381/151 |
| 2013/0342366 A1* | 12/2013 | Kiefer | B60N 2/986 340/901 |
| 2015/0013111 A1 | 1/2015 | White | |
| 2015/0063606 A1 | 3/2015 | Alexiou et al. | |
| 2015/0123774 A1* | 5/2015 | Ioffreda | G06F 3/165 340/407.1 |
| 2016/0107570 A1 | 4/2016 | Modarres et al. | |

FOREIGN PATENT DOCUMENTS

| | | |
|---|---|---|
| CN | 201668681 U | 12/2010 |
| CN | 101968910 A | 2/2011 |
| CN | 103578211 A | 2/2014 |
| CN | 105723735 A | 6/2016 |
| JP | S59-29885 U | 2/1984 |
| JP | H6-7389 U | 1/1994 |
| JP | 2002-240660 A | 8/2002 |
| JP | 2005-223630 A | 8/2005 |
| JP | 2008-39856 A | 2/2008 |
| JP | 2008-72165 A | 3/2008 |
| JP | 2008-77631 A | 4/2008 |
| JP | 2011/155028 A1 | 12/2011 |
| JP | 2016-68667 A | 5/2016 |
| KR | 10-2014-0036367 A | 3/2014 |
| WO | 2015/116022 A1 | 8/2015 |
| WO | 2015/151636 A1 | 10/2015 |

OTHER PUBLICATIONS

European Search Report issued in corresponding application No. 17837785.9, dated Mar. 4, 2020.
CN Office Action dated Jun. 30, 2020 as received in Application No. 201780062084.3.

* cited by examiner

TRANSDUCER SYSTEM PROVIDING TACTILE SENSATIONS

CROSS REFERENCE TO RELATED APPLICATIONS

This application claims the benefit of U.S. Provisional Patent Application No. 62/371,599 filed on Aug. 5, 2016, the contents of which are incorporated by reference herein in their entirety.

SUMMARY

In one or more embodiments, a system providing tactile physioacoustic sensations is disclosed. The system comprises a seat back of a seat, the seat back having a left side and a right side separated by a center-line of the seat back. A first plurality of electroactive transducers are arranged along the center-line of the seat back and provide tactile sound to a user. A second plurality of electroactive transducers in the seat back provide tactile alerts or feedback. The second plurality of electroactive alert transducers comprise a left-side electroactive transducer at the left side of the seat back and right-side electroactive transducer at the right side of the seat back.

In one embodiment, the first plurality of electroactive transducers and the second plurality of directional alert transducers are arranged in a diamond shape.

In one embodiment, the second plurality of electroactive transducers further comprise an additional left-side transducer at the left side of the seat back and an additional right-side transducer at the right side of the seat back.

In one embodiment, the first plurality of electroactive transducers and the second plurality of directional alert transducers are arranged in a transducer grid.

In one embodiment, the center-line corresponds to a location of a user's spine, and the first plurality of electroactive transducers are configured to provide the tactile sound at least partly using bone conduction via the user's spine.

In one embodiment, the system comprises a seat bottom having a left side and a right side. A third plurality of electroactive transducers in the seat bottom to provide tactile alerts or feedback.

In one embodiment, the system further comprises a transducer control system that receives an input audio signal and generates transducer control signals for the first plurality of electroactive transducers based on the input audio signal. The transducer control system also receives vehicle event information and generates transducer control signals for the second plurality of electroactive transducers response to the vehicle event information.

In one embodiment, the vehicle event information corresponds to a blind spot warning, lane departure warning, or a navigation event.

In one embodiment, the transducer control system filters the input audio signal into first audio content in a first frequency range and provides the first audio content in the first frequency range to an upper transducer of the first plurality of electroactive transducers via a first transducer control signal. The transducer control system also filters the input audio signal into second audio content in a second frequency range different than the first frequency range and provides the second audio content in the second frequency range to a lower transducer of the first plurality of electroactive transducers via a second transducer control signal.

In one embodiment, the system further comprises a sensor in the seat. The transducer control system receives sensed information from the sensor and generates, based on the sensed information, at least one of the transducer control signals for the first plurality of electroactive transducers or the transducer control signals for the second plurality of electroactive transducers.

In one embodiment, the seat further comprises a membrane in the seat back that is coupled to the first plurality of electroactive transducers, the membrane dissipating vibrations from the first plurality of electroactive transducers.

In one embodiment, the second plurality of electroactive transducers also provide tactile audio.

In one embodiment, each electroactive transducer of the first plurality of electroactive transducers has two suspension springs.

In one embodiment, a system providing tactile sensations is disclosed. The system comprises a back facing surface of a wearable device for contacting a user's back, the wearable device having a left side and a right side separated by a center-line of the wearable device that corresponds to the user's spine. A first plurality of electroactive transducers are arranged along the center-line of the back facing surface and provide tactile sound. A second plurality of electroactive transducers in the wearable device provide directional tactile alerts or feedback, the second plurality of electroactive transducers comprising a left-side electroactive transducer at the left side of the wearable device and a right-side electroactive transducer at the right side of the wearable device.

In one or more embodiments, a system providing tactile sensations comprises a seat. An electroactive transducer in the seat converts a transducer control signal into motion. A pressure sensor in the seat senses pressure against the seat. A transducer control system generates the transducer control signal based on the pressure sensed by the pressure sensor.

In one embodiment, the transducer control system prevents the transducer control signal from activating the electroactive transducer when the pressure indicates that a user is not present.

In one or more embodiments, the transducer control system compares the pressure to a threshold pressure level and prevents the transducer control signal from activating the electroactive transducer vibrate when the pressure is below the threshold pressure level.

In one or more embodiments, the transducer control system receives an audio signal and applies equalization to the audio signal to generate the transducer control signal, the transducer control system adjusting the equalization based on the pressure sensed by the pressure sensor.

In one or more embodiments, the transducer control system selects settings for the equalization from a set of pre-determined equalization profiles based on the pressure sensed by the pressure sensor.

In one or more embodiments, the pressure sensor is integrated with the electroactive transducer.

BRIEF DESCRIPTION OF THE DRAWINGS

The teachings of the embodiments herein can be readily understood by considering the following detailed description in conjunction with the accompanying drawings.

DETAILED DESCRIPTION

Figure 1:
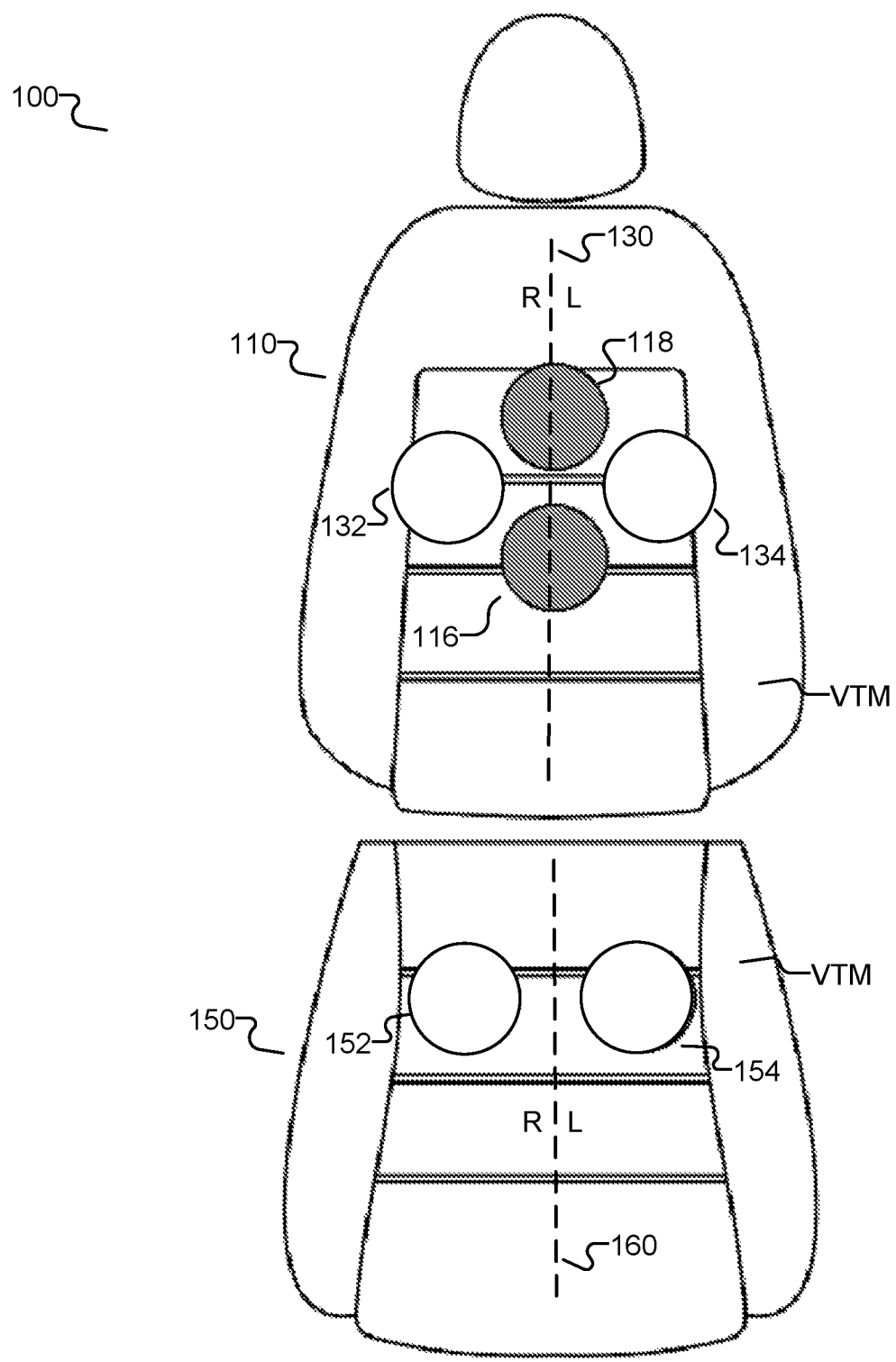
FIG. 1 illustrates a tactile sound device that includes a transducer arrangement, according to an embodiment.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Introduction

One or more embodiments described herein intend to address a number of shortcomings in delivering of quality audio and tactile experiences to human users, when those users are seated in an automobile, theatre or other venue, home or other location. Except in some specific circumstances these environments are not designed to optimize an audio and/or tactile experience, especially at low frequencies such as those generated by music (including both live and recorded), video (Movies, tv and the like), gaming, virtual reality (VR) and augmented reality (AR), simulators (for example flight, earthquake, theme park rides and the like), and other means for generating low frequency information sets.

For example, one or more embodiments described herein may be applicable to automobile or other transport vehicles, such as for example a car, truck, bus, tram, train, airplane, ship and the like.

In the example of current systems designed for providing bass in automobiles, these are power hungry, heavy, large and inefficient, and may cause undesirable noise and chassis vibrations. In the examples of those vehicles for public transport this is exacerbated by each passenger experiencing potentially differing program materials (such as music, movies, tv and the like—for example though individual headphones, seat back screens and the like), which precludes the provision of individual low frequency experiences to each individual.

Further, current seating arrangements in such vehicles have no means to provide any tactile feedback to a human, for example the pilot of such a vehicle, such as the driver of a car (autonomous, semi-autonomous or manual), so as to for example, provide them with alerts and other events that provide information to that person. However, in one embodiment of the present disclosure, if there is an obstacle or other condition (such as another vehicle moving across a lane), then the alert may energize those transducers of a transducer arrangement on the side of the seat that is beside the obstacle or condition. Current seating on public transport also does not provide such a capability, for example passengers may be altered when passing a well-known landmark or monument, or may have an "alarm" call set a predetermined distance from a destination or at a predetermined time.

Current seating also does not detect the posture weight, pilot attention state, sleep/wake state or other biometric feedback characteristics, nor do they provide a means to optimize for that person the experience of any materials they may wish to experience.

Current seating is also not capable of providing active feedback so as to mitigate the effect of such a seat in transit (for example a train, airplane, automobile or other transport seat), where periodic vibrations associated with such transport may, at least in part, be mitigated by generation of output from a transducer arrangement.

One or more embodiments described herein present an arrangement of one or more electroactive transducers, sensors, and control systems to provide a range of tactile and/or audio experiences to one or more human users through one or more structures designed to accommodate a human form, such as a seating arrangement, such as for example, enhanced music listening and feeling experience, more visceral user interface alerts, massage and relaxation sensation, gaming experiences, AR and VR experiences as well as simulations, such as for example engine simulation and other sound and tactile effects.

One or more embodiments considered herein include sets of integrated system elements which in some embodiments may comprise an end to end system capable of providing audible and/or tactile experiences to one or more users in a range of contexts. Some embodiments may include the following system elements:

Transducer Control systems
Transducers and Transducer arrangements
Sensors and other inputs
Feedback systems
User recognition and identification systems One or more embodiments support the generation and application of one or more patterns, comprising a set of input signals and associated commands configured so as to enable a user to have one or more experiences. One key aspect of such a system is the relationship between the transducers forming a transducer arrangement, where the manner in which they are connected to each other and the other system elements (both physically and/or logically) is determinative in the provision of the experience. Another aspect is the creation and deployment of the patterns that provide frameworks, operating controls, triggers, and other specifications that are used by other system elements, generally the control systems, to instantiate an experience for a user. In some embodiments, these system elements may have individual or collective API's which provide their integration with each other and with external systems. Each of these aspects is considered herein.

These systems in whole or in part may be deployed into a range of contexts where human users are the recipients, and in some embodiments, contributors to experiences deployed using such systems. For example, these systems may be integrated into any form of seating, specifically those used in automobiles and other forms of transport, theatres and other performance venues and games, for both single and multiple participants. This disclosure outlines examples of the application of such systems in each of these domains.

In some embodiments, the relationship between transducers in a transducer arrangement may provide both physical, logical and output optimisations. For example an arrangement of transducers that are connected to a common suspension arrangement may be utilized to provide higher frequency output reinforcement that that provided by a single transducer. Transducer alignment, where physical distance between transducers (either with individual or coupled suspension springs), may be aligned to, for example specific body characteristics, such as bone structures so as to optimize the bone conduction tactile sensations, other body elements, such as shoulder blades, ribs or other body areas where, for example the sensitivity to tactile sensations may be enhanced (for example where such tactile sensations may be used for alerts and/or directions), various seat or other structure parameters so as to benefit from the stiffness of a set frame and the optimization of transient behavior of transducer outputs (for example the utilization of such stiffness to reduce overhang or ringing of a transient) and the like, where such contextual integration of transducer arrangement supports one or more optimizations through such physical, logical and output arrangements.

In some embodiments, the triggering of transducers in an arrangement, may include configurations that take account of how vibrations are perceived at different parts of the body/distance from cochlea and consequently may vary relative delay/phase according to such parameters. In some embodiments such specifications may be incorporated into one or more patterns and may be personalized to one or more users (and their associated preferences, including those for a specific context, such as a specific seat in a specific vehicle, venue and the like).

Transducer Arrangements

FIG. 1 illustrates a tactile sound device that includes a transducer arrangement, according to an embodiment. The tactile sound device is a seat 100 for a vehicle (e.g. car, train, airplane, boat). In other embodiments, the seat 100 can be a gaming seat or a movie theater seat.

The seat 100 includes a seat back 110 for supporting a user's back and a seat bottom 150 for supporting a user's buttocks. The seat back 110 includes four electroactive transducers 116, 118, 132 and 134 that are spaced apart from each other in a diamond shape. The electroactive transducers convert electrical signals into motion that can be felt by the user as vibrations. The electroactive transducers may be attached to a vibrotactile membrane (VTM) covering the seat back 110. The seat bottom 150 also includes several electroactive transducers 152 and 154 that convert electrical signals into motion that can be felt by the user as vibrations. The electroactive transducers 152 and 154 may be attached to a vibrotactile membrane (VTM) covering the seat bottom 150.

In the seat back 110, two of the electroactive transducers 116 and 118 can be audio tactile transducers that can convert a low frequency audio signal into vibrations, and allow the user to experience low frequency audio as tactile sound without the need for a subwoofer. The transducers 116 and 118 are located along a vertical center line 130 of the seat back 110. The vertical center line 130 is not physically present in the seat, but is instead a virtual center axis of the seat back 110 that separates the left and right halves of the seat back 110 from each other. The vertical center line 130 extends from a bottom edge of the seat back 110 (which is adjacent to the seat bottom 150) up to the top edge of the seat back 110 (which is adjacent to the headrest). "Left" and "right" in FIG. 1 are determined from the perspective of a person sifting in the seat 100. Described differently, the left and right halves of the seat back 110 are separated by a virtual central plane that divides the left and right halves from each other.

The transducers 116 and 118 are located along the vertical center line 130 so that they will align with the spine of a user sitting on the seat 100. The upper transducer 118 is located closes to the top of the seat back 110 than the other lower transducer 116. The transducers 116 and 118 provide vibrations that are transferred to the user's inner ear through bone conduction. For example when the transducers 116 and 118 are placed against the spine, theses vibrations are transmitted through the user's bones to the inner ear to provide a sense of hearing. In the transducer arrangements described herein, bone conduction provides one of the primary methods for creating and integrating physioacoustic sensations to optimize a user's experience.

The relationship between the positioning of the one or more transducers placed on the spine and the user's experience may be adapted for specific contexts. For example if the transducer is placed at the base of the spine, such as at the bottom of a cinema seat, for example as described in the inverted T, I and/or L arrangement below, this may provide the deeper frequencies that are often found in a movie soundtracks. If the one or more transducers are placed at the mid back, for example between the shoulder blades, these may provide the higher lower frequencies, such as those encountered in music, and thus may be better suited to deployment in a vehicle seat.

In the seat back 110, two of the electroactive transducers 132 and 134 generate vibrations to provide tactile directional alerts or tactile directional feedback to the user. A right-side transducer 132 is located at the right side of the seat back 110 and provides tactile directional alerts or tactile directional feedback to a right side of a user. A left side transducer 134 is located at the left side of the seat back 110 and provides tactile directional alerts or tactile directional feedback to a left side of a user. Due to the location of the transducers 132 and 134 at the sides of the seat back 110, the vibrations produced by the transducers 132 and 134 are used to provide tactile directional alerts to the user (e.g. an alert to look to the left or right while driving) or tactile directional feedback to the user (e.g. for entertainment applications to indicate the presence of a dinosaur on the left or right of the screen).

In some embodiment, the transducers 132 and 134 are located in the right and left seat bolsters of the seat back 110. As shown in FIG. 1, both transducers 132 and 134 may be equidistant from the center line 130. Transducer 118 is closer to the top edge of the seat back 110 than transducers 132 and 134. Transducer 116 is closer to the bottom edge of the seat back 110 than transducers 132 and 134.

In the seat bottom 150, the electroactive transducers 152 and 154 are also transducers that generate vibrations to provide tactile directional alerts or feedback to the user. A center line 160 of the seat bottom 150 is a virtual center axis of the seat bottom 150 that separates the left and right halves of the seat bottom 150 from each other. Right side transducer 152 is located on the right half of the seat bottom 150, and left side transducer 154 is located on the left half of the seat bottom 150.

In some embodiments, the electroactive transducers primarily used for tactile sound (116, and 118) can be of a larger size than the other transducers primarily used for directional alerting and feedback (132, 134, 152, 154). This is because the parts of the human body that will contact the other transducers (132, 134, 152, 154) senses with less precision. Similarly, the VTM structure for the electroactive transducers primarily used for tactile sound (116, and 118) can be of a different structure (e.g. thinner, different materials) than the other transducers (132, 134, 152, 154) used for directional alerting and feedback.

The transducer arrangements and associated control systems may be optimized for their deployment contexts, such that a user experiences conditions which provide an integrated rendering of the source content as reproduced by the transducer arrangement. The arrangement of the transducers provides differing sensations for a user, resulting in a multisensory synthesis that is part of physioacoustics.

For example in the transducer arrangements described herein, there are four areas where a transducer arrangement produces specific outcomes that are part of the physioacoustic experience. These outcomes may be conveyed through one or more vibro tactile membranes (VTM), which may be in direct, for example to a user's skin, or indirect, for example though a user's clothing, contact. In some embodiments a transducer arrangement may be capable, though the use of one or more sensors, of detecting the degree of direct or indirect contact, and subsequently configuring the transducer arrangement to account for such conditions in the optimization of the user experience.

In the case of skin contact, the receptors on the skin register vibrations on the surface, which is termed haptics, and may provide a range of tactile sensations associated with touch and feel. In some embodiments this may be used for indicating directionality or creating the sense of movement. In some embodiments, such as the honeycomb arrangement described herein, where each transducer element may be small, for example less than 1 cm, multiple transducers may in contact with part of the skin, for example a leg, or forearm, and provide a sensation of movement up or down such limbs.

Transducers placed near or on muscles provide two parts of the transfer function encompassed in physioacoustics, proprioception and interoception, both of which employ the receptors in muscles to detect subtle changes ion force and/or pressure. For example, if one or more transducers were placed against the buttocks of a user, a sense of changes in pressure and force may be conveyed. For example, in the LL, X and diamond arrangements described herein, such transducers may convey the attack and decay of the information being reproduced, including for example anticipatory sensations such as a sensed reduction of force before a large explosion or other soundtrack effect.

In some embodiments, the integration of transducer arrangements may be optimized so as to produce specific targeted sensations, using skin, bone and muscle derived sensations to create an integrated multisensory sensation. For example, in the honeycomb arrangement described herein, the combination of transducers and one or more VTM may provide highly targeted sensations, such as those associated with game play, where for example a user sense the impact of a "bullet" or other projectile at the specific spot indicated by the game play.

For example, if the pattern being executed is a "rabbit" pattern, then an initial transducer in an arrangement may receive an input signal and produce an output proportional to that input signal, a further transducer may then receive a further input signal and produce an output proportional to the input signal, and so forth, such that the user is aware that the outputs are moving in relation to the user, for example form left to right or from top to bottom. Such a pattern may be used to indicate to a user that they look in that direction, or that they turn a vehicle in that direction, if for example they were following a navigation system.

In some embodiments transducers may have specific arrangements for one or more deployments, such as those for human wearable, built into seating or other human supporting structures, built into environments (for examples walls, floors, structure supporting and nor structure supporting panels and the like). Such deployed arrangements may be for single or multiple purposes, for example audio, audio and events, haptic and audio, tactile and audio. For example, a single purpose may be an optimized audio experience where the deployed transducer arrangement (which may include one or more sensors) and the controlling systems (for example specifications, programs and their instantiations), provide such an optimized audio experience for one or more specific humans, where for example such human is recognized and/or registered with such arrangement and controlling systems. Each of the arrangement described herein may be deployed in a suitable environment so as to provide a range of physioacoustic benefits to a user. For example, a multiple L formation may be deployed in a sofa that is part of a domestic environment, coupled together with an appropriate VTM, to provide a range of sensations associated with entertainment (TV/Movie) soundtracks and/or to act as a subwoofer for the rendition of audio.

In some embodiments, such optimized audio experiences may be integrated with, for example a haptic alert system. For example, such a system may use one or more of the transducers in a deployed arrangement to indicate to a human, for example a human in a seating arrangement, that there is an event, including for example anticipated events as determined by one or sensors, where such sensors may be associated with such transducer arrangement, is about to occur or occurring. For example, a commuter on a train or bus may get a "nudge" when their stop is approaching.

The physical arrangements of transducers may be optimized to their intended purpose, and the following non limiting examples include:

"T arrangement"—where the transducers are placed on a horizontal axis and vertical axis where there is at least one transducer that is part of both vertical and horizontal axis. The T may be either normal (T) or inverted (⊥).

"I arrangement"—where the transducers form a single line comprising at least two transducers, generally such an arrangement having such transducers placed at equal distance from each other. This is described as the "Constant I arrangement". A further variant of the "I arrangement" is where the transducers forming such an arrangement are placed at distances that vary from each other. This is described as the "Variant I arrangement"

"H arrangement"—where there are two parallel I configurations (including both constant and variant arrangements) with a further horizontal set of transducers, which may also be considered an "I arrangement of either constant or variant type, comprising at least three transducers, where at least two of those transducers form a part of each of the vertical I configurations, where such transducer is placed in the middle of at least two others forming such an I configuration.

"L arrangement"—where there are two axes, one vertical and one horizontal both comprising an "I arrangement" of either type.

"LL arrangement"—where there may be two L arrangements which are parallel to each other and separated by a specified distance. For example, such an arrangement may be included in a seating structure, such that each L arrangement is on either side of the spine of a person sitting in such structure. A further variant may have one or more I arrangements, or ether type connecting the two L arrangements. These connections, in some embodiments may be at 90 degrees to the L arrangements, however they may also be at any other angle. In some embodiments, such arrangements may include one or structural elements that both include and support the transducer arrangements.

"X arrangement"—where two "I arrangements", or either type that are placed such that they intersect at a common point, usually a single transducer forming part of each constituent I arrangement and normally having a 90 degree angle between each I arrangement at that point of intersection. However, the intersection may be at any suitable angle to create an X shape. The X arrangement may incorporate transducers at the extremities of the X (upper right and left, lower right and left) that may provide directional information to a user, for example indicating a situation requiring attention or introducing a direction cue in a soundtrack and/or the like.

"Diamond arrangement"—The diamond arrangement is illustrated by the seat back 110 in FIG. 1. There are four "I arrangements" placed at right angles to each other forming a diamond shape, and where at each "I arrangement, or either type, shares a common transducer with its neighbor. In some embodiments, a diamond shape provides the basic transducer arrangement whereby a user has at least one transducer that imparts sensations through the spine, using bone conduction, one transducer 118 imparts sensation through the upper back through proprioceptors and interoceptors, which provides a user with the sensations associated with the attack/decay and transients of the represented signal conveyed by the VTM. The left and right transducers provide the directional sensations for a user, such that the experience of a user is an integrated phsysioacoustic sensation. For example, the information conveyed through the lower transducer 116 in such an arrangement may differ from that in the upper transducer, for example the lower transducer may provide the lower set of the frequencies (for example 120 Hz or lower) and the upper may convey the upper set of these frequencies (for example 120 hz to 250 Hz). In this example, the attack/decay of the signals presented to the transducers may also vary, for example through the operation of one or more DSP.

"Radial/Concentric arrangement"—One aspect of the disclosure is the use of one or more membranes that are connected to a transducer arrangement, where such membrane causes outputs from transducer arrangement to be propagated in a distributed manner such that the dispersion of the generated output is transmitted uniformly across the membrane. In such an embodiment, this effect is called acoustic lensing. The radial arrangement, in common with a diamond shape includes at least one upper, lower, left and right transducer, forming a circular pattern. —In some embodiments there may be two or more concentric circles, with an inner and outer circle, which may be controlled independently.

"Matrix arrangement"—where there are at least two I arrangements placed in parallel, where such I arrangements comprise at least two transducers, such that each transducer is at the end point of each I arrangement.

"Honeycomb and other integrated arrangements"—In some embodiments each transducer may have an associated distributive element, such as for example, circle, hexagon or any polygon, optimally in hexagonal packing, that is activated by the operation of the transducer. Such distributive element may then be coupled to at least one VTM. In some embodiments such transducers may be of 1 cm diameter or less, providing a highly granular reproduction of the incoming signal. In some elements, these transducers may be linked, mechanically and/or through common control systems. In some embodiments, such an arrangement may form a common membrane (for example, including one or more VTM) to which one or more sets of transducers are connected. For example such an arrangement may include:

These polygons can vary in size.

In some embodiments, one side of such an arrangement may be a plate or a plate with engineered features to enable parts of the plate to move independently, with multiple voice coils on the center of each polygon, with each voicecoil connected to the control system via a pixel grid, or via location aware mechanism described previously.

The other side can have multiple masses attached for each polygon, with engineered features to separate these polygons.

When these two sides are brought together, it forms a contiguous transducer with multiple cells.

One side can be contiguous with engineered features. The other side can be contiguous or discrete.

Activation/motion can be via voice coil or any other electromagnetic repulsion scheme, piezoelectric, or pressure based/pneumatic.

Such a transducer arrangement may include an integrated sensor array, for example including gyroscopes, accelerometers, GPS/GNSS or other location identifiers and the like.

In some embodiments, a seat or other human supporting structure, such as for example a bed, couch, or similar may comprise a set of transducer arrangements, where for example each transducer element in such an arrangement is coupled to a common distributive element, for example one or more VTM, such that a range of audio and tactile generations may be undertaken across the complete surface and/or any part thereof.

In some embodiments transducer arrangements may be optimized for one or more contexts, such as for example seating in a motor vehicle. Each of these arrangements may configure one or more of the characteristics of the transducer arrangements outputs so as to provide an optimized experience for an individual in a specific context (for example a seat in a specific car or car type).

In some embodiments the axis, positioning and relative locations of the transducers may be varied, such that the X-Y-Z relationships of the transducers may be varied. In some embodiments these variations may be undertaken by associated motors or other means of physical displacement, such that for example a transducer may be rotated horizontally, tilted vertically or the distance between the user and the transducer and/or transducer arrangement (including the vibrotactile membrane) may be varied.

Figure 2:
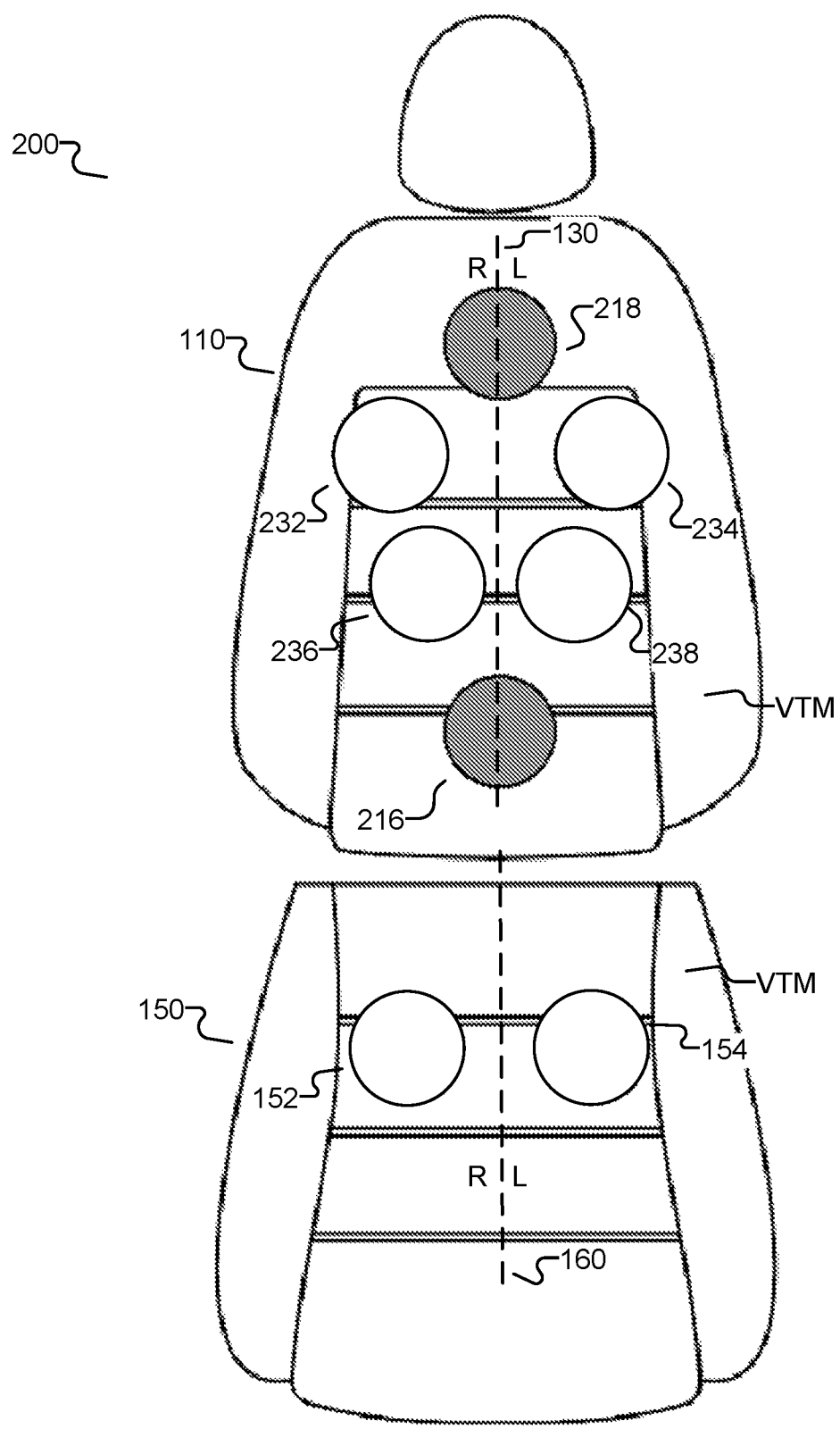
FIG. 2 illustrates a tactile sound device that includes a transducer arrangement, according to another embodiment.

FIG. 2 illustrates a tactile sound device that includes a transducer arrangement, according to another embodiment. The tactile sound device is a seat 200. The seat 200 is similar to the seat 100 from FIG. 1, but now the seat back 110 includes an arrowhead shaped transducer arrangement that generally corresponds to the shape of a user's back.

Two of the transducers 216 and 218 are audio tactile transducers that provide tactile sound, and are located along the center line 130. Four of the transducers 232, 234, 236 and 238 are directional alert transducers that generate vibrations to provide directional alerts to the user. Two transducers 232 and 236 are located at the right side of the seat back 110. Transducer 232 is located higher up on the seat than transducer 236. Two transducers 234 and 238 are located at the left side of the seat back 110. Transducer 234 is located higher up on the seat than transducer 238.

Figure 3:
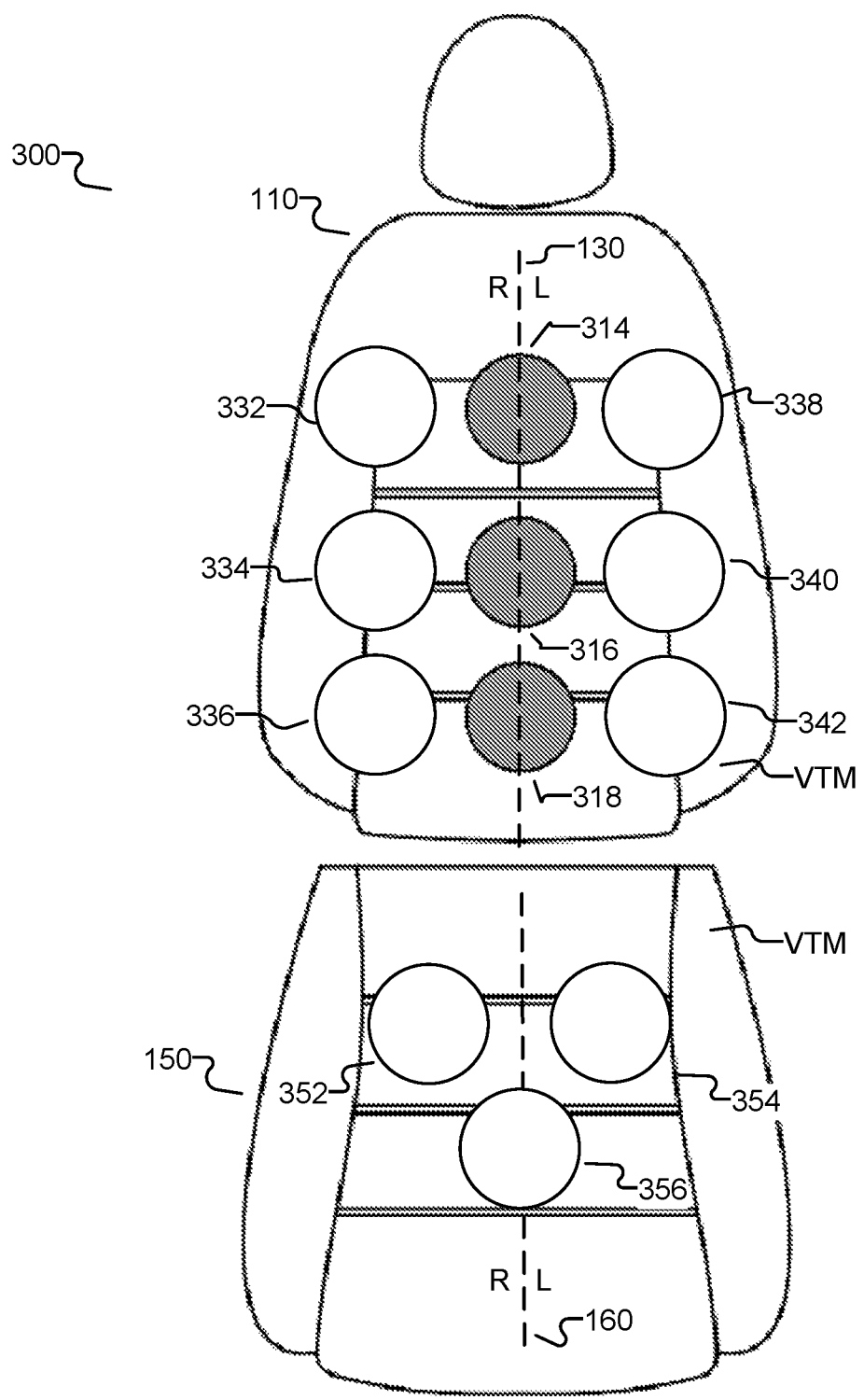
FIG. 3 illustrates a tactile sound device that includes a transducer arrangement, according to another embodiment.

FIG. 3 illustrates a tactile sound device that includes a transducer arrangement, according to another embodiment. The tactile sound device is a seat 300. The seat back 110 now includes a 3×3 matrix of transducers. Three of the transducers 314, 316 and 318 are audio tactile transducers located along the center line 130. Six of the transducers 332, 334, 336, 338, 340 and 342 are directional alert transducers. Three of the directional alert transducers 332, 334 and 336 are located in the right half of the seat back 110. The other three directional alert transducers 338, 340 and 342 are located in the left half of the seat back 110.

The seat bottom 150 now includes three transducers. Two of the transducers 352 and 354 are directional alert transducers. The remaining transducer 356 is n non-directional alert transducer that provides an alert to a user via vibrations. Transducer 356 provides a non-directional alert since it is located directly on the center line 160 of the seat bottom 150.

Vibro Tactile Membrane

Figure 4:
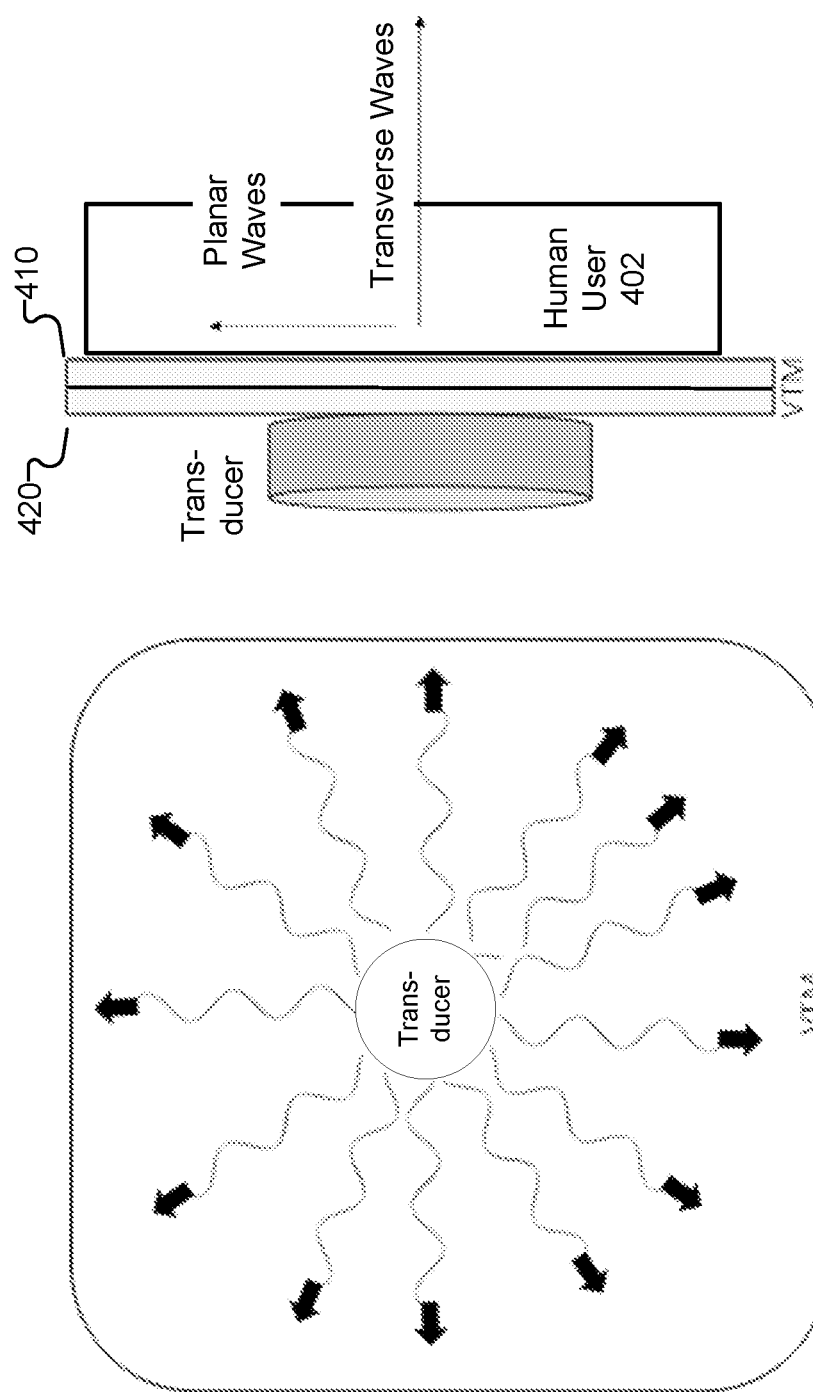
FIG. 4 illustrates a transducer coupled to a vibro-tactile membrane (VTM), according to an embodiment.

FIG. 4 illustrates a transducer coupled to a vibro-tactile membrane (VTM), according to an embodiment. The left side of FIG. 4 is a plan view of the VTM and transducer. The right side is a side view of the VTM and transducer. The VTM may be comprised of multiple layers. One aspect of the use of such membranes is to provide a damping function for the transducer such that planar waves are transferred to the human user 402 in a consistent and appropriate manner.

In some embodiments, transducers are coupled to a VTM, which comprise multiple layers of one or more materials. For example this may include one or more engineered surface features, pockets, layouts and or the like. One aspect of the employment of such membranes is to provide a damping function for the transducer such that transverse waves are transferred to the side proximal to a user 402. The VTM enables planar waves originated from the transducer to be dispersed in a radial manner through conduction by such VTM, where each layer of the VTM may provide differing conduction and transfer characteristics (for example varying, frequency response, attenuation, transient response and the like) such that the transducer output is transferred as transverse waves across the entire area of the VTM.

In some embodiments, the purpose of VTM is to dampen transducer generated output so as to spread these across the surface area of the transducer arrangement in a comfortable manner while preserving the output frequency response of the transducer arrangement. If a tactile transducer is mounted on a non-VTM surface (for example a hard contiguous surface such as a table top or rigid seat back), the entire surface emits low quality audio. If the transducer is placed on a pliant surface (for example a piece of paper, foam, cloth or similar), the surface emits a low quality audio output. In both cases the emissions are of low fidelity, not representative of the input signals with a frequency response that is in part dictated by the resonant frequency of the transmission medium and highly curtailed by such mediums characteristics, such that the medium operates as a single vibrating platform with no dispersion characteristics, nor damping effect on the transducer.

The VTM, in contrast disperses the transducer outputs (e.g. vibrations) in a manner that is representative of and compatible with human hearing whilst preserving the relative intensity and frequency balance of the input signals. This is achieved whilst configuring the processing of one or more control and/or active feedback systems so as to accurately represent the relative differences in sensitivity between hearing perceptive senses and tactile perceptive senses. This may be optimized both for individual humans, specific instantiations and one or more environmental factors through the integrated active feedback and control systems.

In one embodiment, the VTM includes a primary membrane 410 and a secondary membrane 420. The primary membrane 410 is a large, rigid membrane and can be made of any of a number of thermoplastics, such as polypropylene, HDPE, PVC, and the like, or of composite materials, such as carbon-fibre. The secondary membrane 420 can be a microcellular polymer membrane made of microcellular elastomers (EVA), urethanes (PU), rubbers, and the like; but is preferably comprised of microcellular polyurethane, which has a greater dampening effect on vibrations. The secondary membrane 420 can have less surface area than the primary membrane 410

Transducers

Figure 5A:
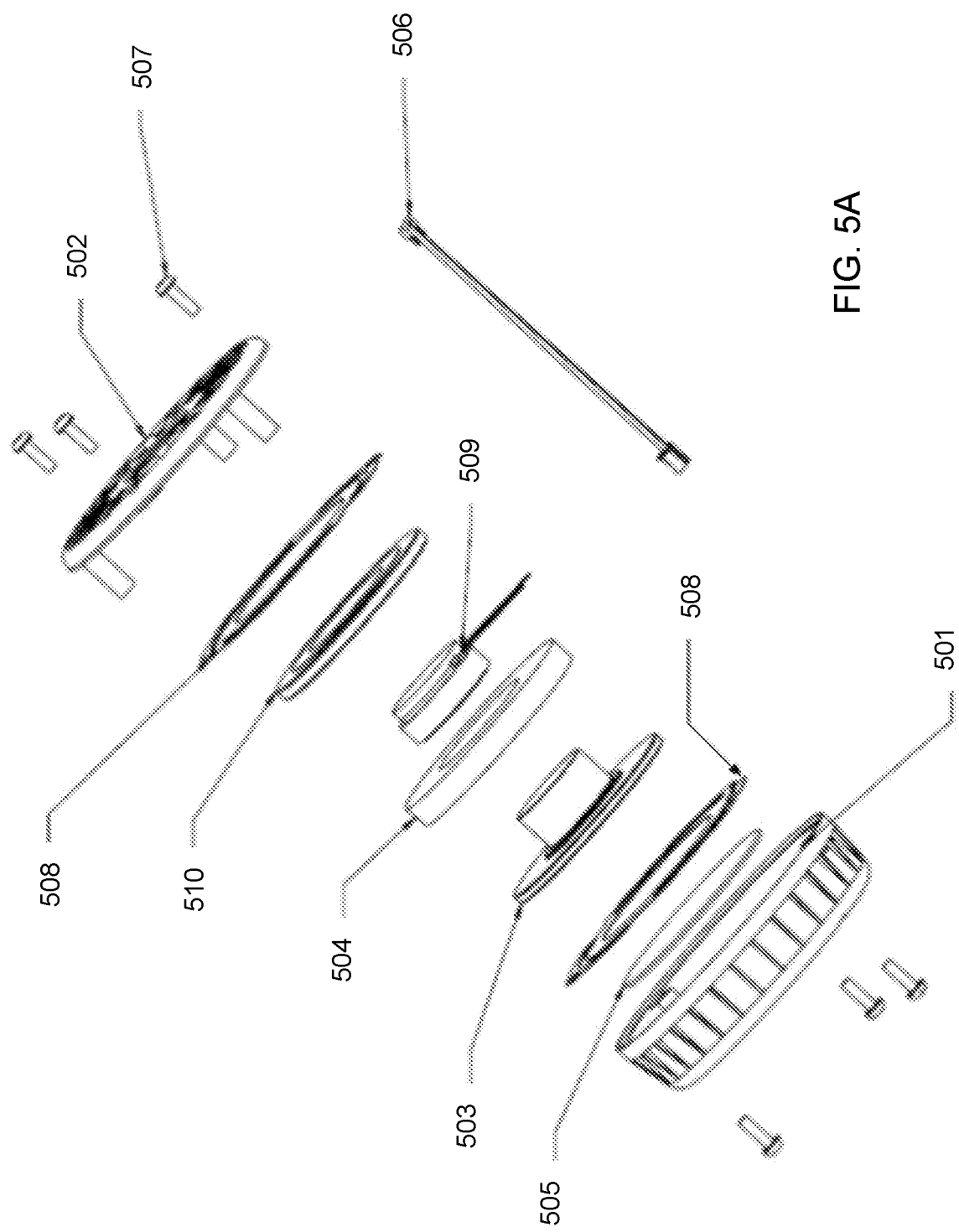
FIG. 5A and FIG. 5B are different view of a transducer, according to an embodiment.
Figure 5B:
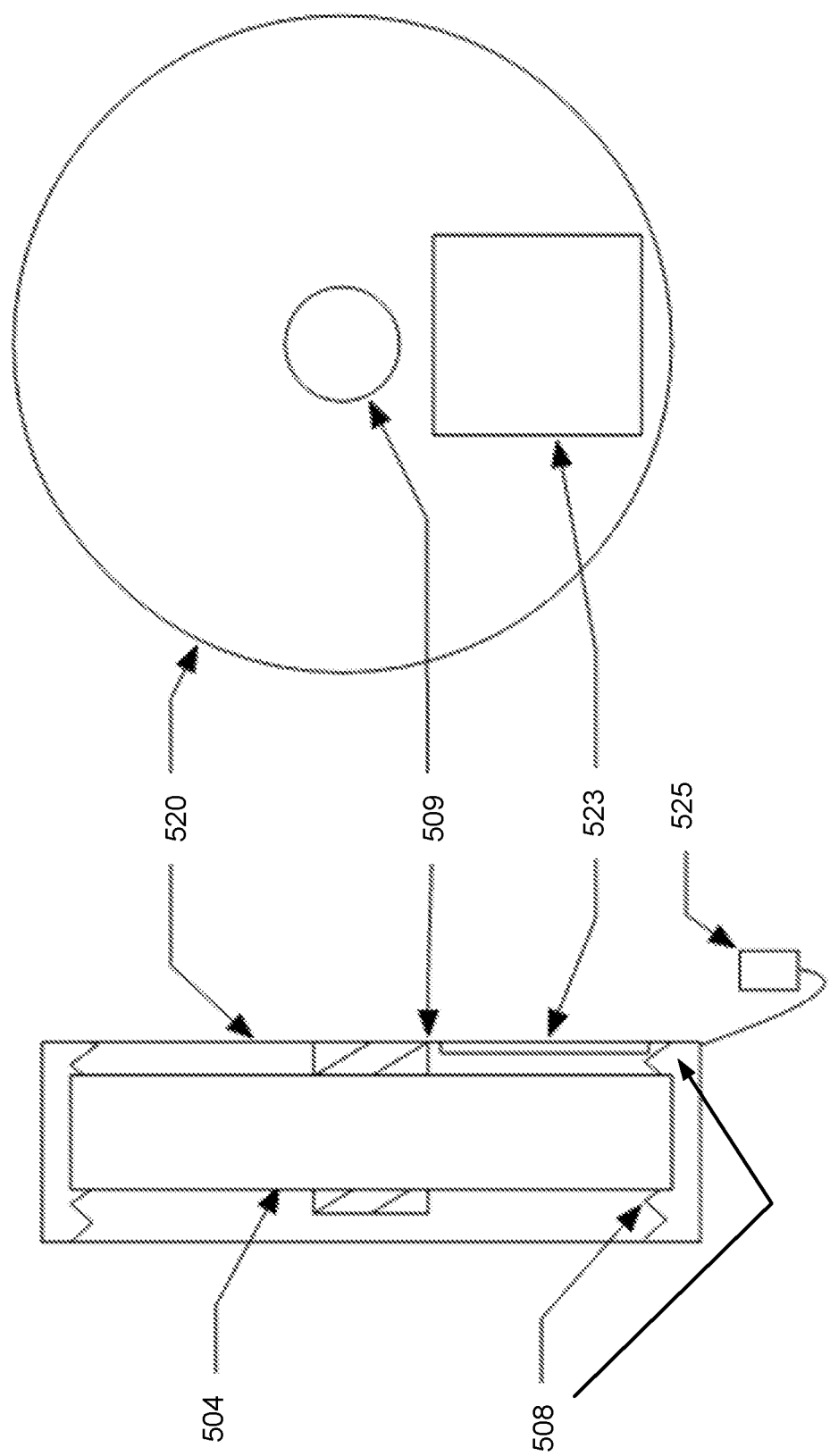

FIG. 5A and FIG. 5B are different view of a transducer, according to an embodiment. The transducer shown in FIGS. 5A and 5B can be used as any of the transducers in FIGS. 1-4 or any other figures. An electroactive transducer can convert an electrical signal into motion. Some embodiments herein may include one or more electroactive transducers. Some embodiments can use a tactile transducer with a response range from 5 Hz to 200 Hz. In such an example embodiment, the transducer is coupled to a multistage vibro-tactile membrane which is comprised of a primary membrane that dissipates the force from the transducer across its area; and, a secondary membrane that directly transmits the forces from the primary membrane towards the user.

The embodiment described herein includes a number of innovative features and is focused on the magnet part of the transducer providing the movement that creates the tactile/audio output.

As shown in FIG. 5A, the transducer includes a Plastic back cover 501, Plastic front plate 502, T-yoke 503, Permanent magnet mass 504, Foam 505, Wire harness 506, Screws 507, Spring spiders 508, voice coil 509, and Top plate 510. As shown in FIG. 5B, the transducer can also include a printed circuit board 523, connector 525, voice coil 509 and enclosure 520. The connector 525 may include at least one of signal/power/feedback/digital/analog in any combination. The circuit board 523 is for control systems (may include feedback systems, sensor systems) and other electronics (may be mounted internally or externally of enclosure).

In some embodiments, transducers may incorporate at least two suspension springs 508. The suspension springs 508 can be coupled to and support the magnet mass 504. Generally current transducers have a single spring, whereas an embodiment described herein has at least two such suspension springs 508. The effect of these springs is to provide a linearity of movement of the transducer that is not possible with a single spring. In systems employing a single spring, the transducer will be subject to lateral forces that in large part depend on the material of the suspension spring. If the single spring has a great deal of stiffness, which to some degree will ameliorate the lateral displacement of the transducer, the transducer will require substantially more energy to overcome this stiffness. This may also have a significant effect on the transient response of a transducer.

The use of two springs 508 provides a higher degree of linearity for the transducer reducing lateral displacement and proving a greater degree of granular control. Such control becomes more important as the number of individual transducers in a transducer arrangement increases.

In some embodiments, each of the suspension springs 508 may have anisotropic properties, such that each suspension element has differing properties in different axes, such as for example mechanical, thermal, electrical and the like.

In some embodiments, multiple transducers may share a common suspension arrangement, which may for example, include multiple elements. In such an arrangement each transducer may operate in collaboration with other transducers to create a specific tactile and/or audio experience. For example, an output may be generated by a transducer and then each subsequent transducer in a specific sequence may generate a further output, where such output may have the same or derived characteristics. For example, the intensity, frequency and/or duration of such output may be varied through one or more control systems. In some embodiments a transducer may have an associated sensor set which detects such a generated output and consequently provides such information to a control system to activate one or more other sensors, including the one associated with such sensor and/or may provide an output which causes such a transducer to generate an output without instructions from such a control system.

In some embodiments, each suspension spring 508 and/or combinations thereof including suspension springs that connect to multiple transducers may have one or more further materials bonded or in other ways attached to such springs. For example, such a bonded element may be electroactive, such that the degree or stiffness or other characteristics of the underlying suspension element may be modified by the application of electrical energy. This may, for example, include dynamically varying such application in response to incoming signals, feedback signals or other contextual information. In some embodiments, suspension springs 508 may be formed of layers of materials, some of which may differ in stiffness or other physical and/or electrical characteristics, such that the performance of the transducer may be impacted by such springs, so as to for example optimize such performance, including dynamically for one or more purpose.

In some embodiments the suspension springs 508 of two transducers may be connected, directly or through a further medium forming a mechanically linked medium that may be energized by activation of a set of transducers in any arrangement.

In some embodiments, a transducer is attached to one or more membranes (e.g. VTM) which act to disperse movement generated by a transducer arrangement. For example, such a membrane may comprise multiple layers, where each layer acts as a transfer mechanism for planar and/or transverse waves generated by such transducer arrangement. Without such membranes, the vibrations and the displacement of the transducer can be harsh, uncomfortable and incompatible with an audio experience.

Control Systems

Figure 6:
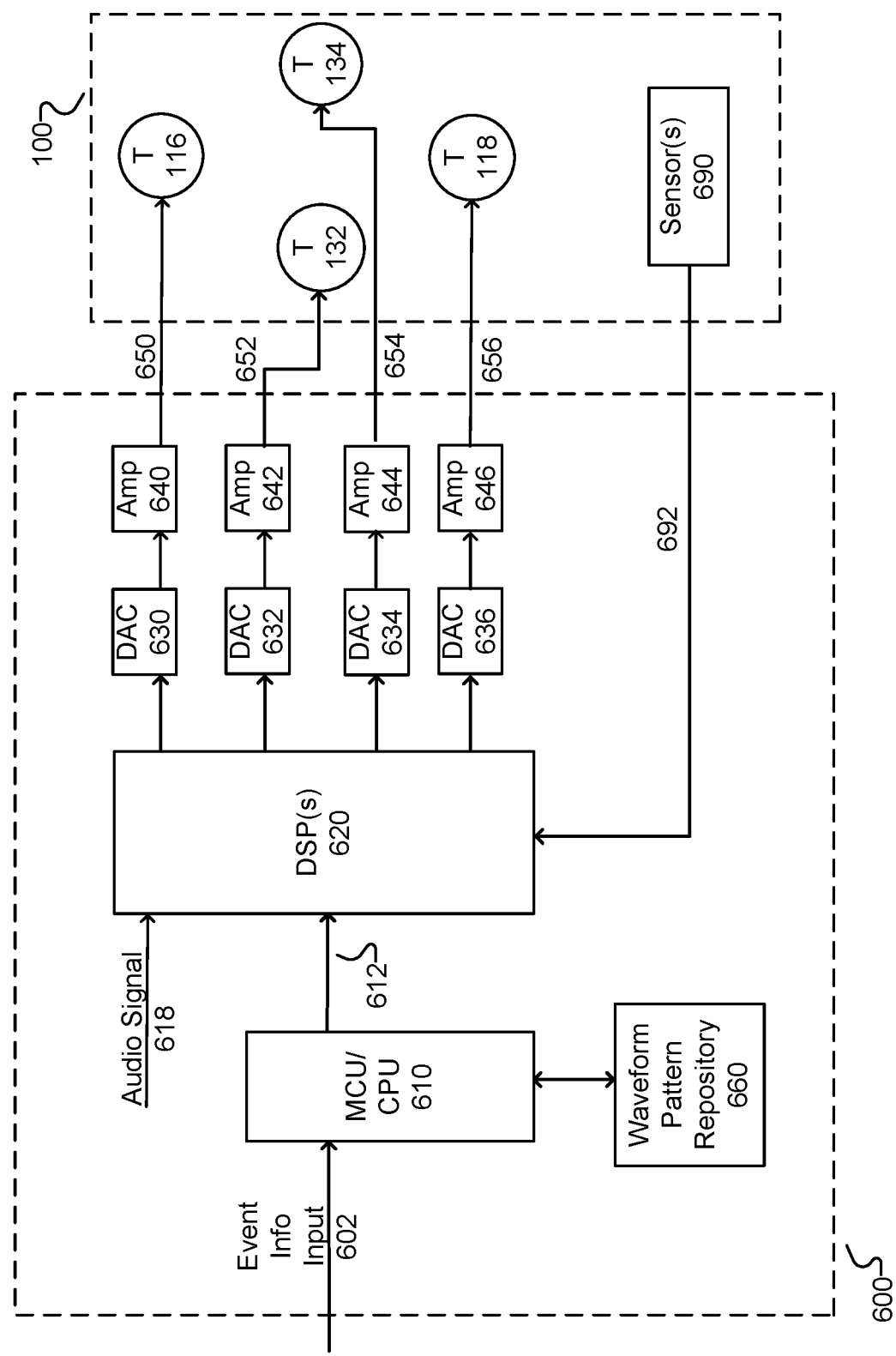
FIG. 6 illustrates a system that includes a transducer control system and a tactile sound device, according to an embodiment.

FIG. 6 illustrates a system that includes a transducer control system 600 and a seat 100, according to an embodiment. The transducer control system 600 includes a microcontroller unit (MCU) or central processing unit (CPU) 610, a digital signal processor (DSP) circuit 620, digital to audio converter (DAC) circuits 630, 632, 634, 636, amplifier circuits 640, 642, 644, 646 and a waveform repository 660. The seat 100 includes audio transducers 116 and 118, and directional signaling transducers 132 and 134. The seat 100 also includes one or more sensors 690. The sensors 690 can be located in the seat back 110 or seat bottom 150. In some embodiments the sensors 690 are external to the seat 100.

The transducer control system 600 generates transducer control signals 650, 652, 654 and 656 that are converted by the transducers 116, 118, 132 and 134 into motion. In one embodiment, the event information input 620 affects how the transducer control signals 652 and 654 for the side transducers 132 and 234 are generated. The audio signal input 618 affects how the transducer control signals 650 and 656 for the audio transducers 116 and 118 are generated. In other embodiments, the event information input 602 can affect how all the transducer control signals are generated, and the audio signal 618 can affect how all the transducer control signals are generated. The transducer control system 600 can also receive sensor output signals 692 indicative of sensed information and use the sensed information to adjust how the transducer control signals 650, 652, 654 and 656 are generated. Although now shown in FIG. 6, the transducer control system 600 can also generate transducer control signals for controlling any of the transducers shown in the other figures.

In specific, the MCU/CPU 612 receives event information 602 indicating the presence of an event that is external to the seat 100, and uses the event information 602 to select a specific waveform pattern from the waveform repository 660. Each event may be associated with a specific waveform pattern that provides an alert for that event. In one embodiment, the event information is vehicle event information that indicates the occurrence of vehicle events related to the operation or safety of a moving vehicle. For example the vehicle events can be:

Blind spot warning event—The blind spot warning can be the presence of a car in the left or right blind spot of a vehicle. The waveform pattern for the blind spot warning causes the directional signaling transducer on the left or right side of the seat 100 to vibrate, thereby providing a tactile alert to the user to look left or right. The information for the blind spot warning can be received from blind spot sensors.

Lane departure warning event—The lane departure warning can be the detection that the driver's vehicle has swerved too far to the left or right. The waveform pattern for the blind spot warning causes the directional signaling transducer on the left or right side of the seat 100 to vibrate, thereby providing a tactile alert to the user to move back into the lane. The information for the lane departure warning can be received from lane departure sensors.

Navigation event—The navigation event can be an upcoming left or right turn. The waveform pattern for the left or right turn causes the directional signaling transducer on the left or right side of the seat 100 to vibrate, thereby providing a tactile alert to the user to turn left or right. The information for the navigation event can be received from a car navigation system.

The DSP 620 receives the selected waveform pattern 612 from the MCU/CPU 610 and uses the selected waveform pattern 612 to generate digital signals provided to DACs 630 and 636. The DACs 630 and 636 convert the digital signals into analog signals, and the analog signals are then amplified by the amplifiers 640 and 646 to generate the transducer control signals 650 and 656. The DSP 620 may also receive timing information from the MCU/CPU 610 specifying a timing for how transducers should be activated, and then generate the digital signals for the DACs 630 and 636 in accordance with the timing information.

The DSP 620 also receives an audio signal 618 and applies digital signal processing to the audio signal 618, and outputs the processed digital signals to the DAC 632 and 634. The DACs 632 and 634 convert the digital signals into analog signals, and the analog signals are then amplified by the amplifiers 642 and 644 to generate the transducer control signals 652 and 654. In this manner, audio content of the audio signal 618 can be provided to the audio transducers 116 and 118 via the transducer control signals 650 and 656. In one embodiment, the DSP 620 applies equalization to the audio signal 618 when generating the processed digital signals for the DACs 632 and 643.

In one embodiment, the DSP 620 applies filtering to the audio signal 618 to divide the audio signal 618 into different frequency ranges. Audio content in a low frequency range (<40 Hz) can be provided to the audio transducer 118 at the lower back via the transducer control signal 656. Audio content in a higher frequency range (between 40 Hz and 200 Hz) can be provided to the audio transducer 116 at the upper back via the transducer control signal 650. The frequency ranges are different but may overlap in some embodiments.

The sensors 690 can sense changes in the environment and generate output sensor signals 692 that are indicative of the sensed changes and provide sensor information about the changes to the environment.

In one embodiment, the sensors 690 include pressure sensors that sense pressure exerted by the human user against the seat. The pressure sensor can be located in the seat back 110 or the seat bottom 150. The pressure sensors output pressure sensing signals indicating an amount of the detected pressure. The DSP can take one or more actions in response to the pressure.

In one embodiment, the DSP 620 can compare the pressure to a pressure threshold. If the pressure threshold is exceeded, this means a person is sitting on the seat and so transducer control signals 650, 625, 654 and 656 can be activated and generated in their normal manner to provide tactile sound and tactile alerts to a user. On the other hand, if the pressure threshold is not exceed, this means a person is not sitting on the seat. As a result, the transducer control signals 650, 652, 654 and 656 can be generated in a manner that prevents the transducers 116, 118, 132 and 134 from being activated. Alternatively, if the sensed pressure indicates that too much force is exerted on a particular transducer, the transducer control signals may have their amplitudes reduced or terminated so as to temporarily shut down the transducer and/or user alerts.

In one embodiment, the DSP 620 adjusts the frequency equalization applied to the audio signal 618 based on the pressure sensed by the pressure sensor. For example, using the pressure sensed by the pressure sensor, the DSP 620 can select a set of equalization settings for the frequency equalization from a set of pre-determined equalization profiles.

Other sensors 690 and their uses will be described in later portions of the specification.

In some embodiments, the transducer control system 600 may comprise a set of devices that receives at least one of an incoming signal (e.g. 602 and 618) and one or more feedback signals (e.g. 692) which are then used, in part to determine the operation of one or more system components, such as analog to digital converters, digital signal processors 620 and associated control specifications, digital to analog converters 630, 632, 634, 636, amplifiers 640, 642, 644, 646 and associated electroactive transducers 116, 118, 132, 134. These system elements may be combined into one or more hardware and/or software instantiations. Such a system may generate a range of transducer outputs in response to one or more incoming signals and/or one or more feedback signals. Such feedback signals may include those derived from the operations of a transducer arrangement and any associated membranes, suspension couplings, incorporated sensor arrangements and/or other transducer generated, directly or indirectly, feedback; environment sensed, including by sensors communication with a transducer arrangement control system, such as for example a human wearing a smart watch or other device; biofeedback—derived at least in part from one or more humans in the environment and the like.

In some embodiments, for example signal paths of a system architecture are presented herein.

In some embodiments a transducer control system 600 receives an analog mono, stereo and/or multichannel audio signals 618. Such a signal can be processed to provide an appropriate input to electroactive transducers 116, 118, 132 and 134, for example an analog signal input to electroactive transducers. In some embodiments, one or more signal processing operations can be undertaken, for example these may include filtering of such signals, such as for example low pass filtering, shelf filtering, notch filtering. Such input signals, in some embodiments, may be, using one or more signal processing techniques, segmented so as to separate and provide different frequency bands of an input and/or feedback signal to one or more electroactive transducers in an arrangement. In some embodiments, this may include separating and providing different channels of audio, derived in whole or in part form one or more input and/or feedback signals to one or more electroactive transducers 116, 118, 132 and 134, where such provision of signals is, in part, in response to specific characteristics of such incoming signal 618 and/or the specific arrangement of such transducers 116, 118, 132 and 134.

In some embodiments, the transducer control system can receive a digital audio input signal 618, such digital signal can include mono, stereo and/or multichannel audio as well as one or more sets of metadata. In some embodiments, such a signal may be multiplexed according to one or more time bases, such that multiple signal sets may be provided simultaneously. This signal is processed to provide an appropriate input signal to an arrangement of electroactive transducers 116, 118, 132 and 134. The signal processing for the audio component can include low pass filters, shelf filters, notch filters; as well as separating and feeding different frequency bands to various electroactive transducers, or separating and feeding different channels of audio to various electroactive transducers.

These two embodiments are used in cases where the signal that is sent to the electroactive transducers is determined externally. For example, these two example embodiments can be used to augment audio with tactile sensations for an enhanced music listening and feeling experience, more responsive user interface alerts, massage and relaxation sensation, as well as engine simulation and other sound and tactile effects.

In some embodiments, the transducer control system 600 may comprise one or more computing arrangements, for example including, circuits, central and distributed processing, volatile and non-volatile memory, transient and persistent storage, sensors, activators, communications systems, HMI (Human Machine Interface) systems and associated specifications, programs, control logic and other instruction information sets. In one embodiment, the control system 600 includes a non-transitory computer readable medium (e.g. memory, etc.) that stores executable instructions. The instructions are executed by at least one processor to implement one or more of the operations described herein.

In one embodiment, the control systems 600 support the configuration and operation of one or more transducer arrangements and any incorporated and/or associated sensor systems and through one or more appropriate API any integrations with other sensing, environment, control and/or other external systems.

This disclosure describes such control systems and their configurations and operations. Some embodiments described herein have a common capability wherein each transducer, for example one of a transducer arrangement, may be uniquely identified, within such an arrangement, and have one or more transducer control signals 650, 652, 654 and 656 supplied to that transducer under the control and operative guidance of such a control system 600. As the transducers themselves are analog devices, in that they convert an incoming electrical signal to movement, such signals can be delivered by one or more amplifiers 640, 642, 644 and 646 to each transducer element. In one embodiment, these signals may be provided from a single point, for example a single amplifier (e.g. an analog signal provided to a transducer).

In some embodiments a digital transducer may be used, where such digital transducer comprises an analog element for conversion of incoming signals to movement, an amplifier unit that drives such transducer element to create such movement and a DAC (Digital to Analog Converter) to transfer the incoming digital signal to one suitable to operate such an amplifier and generate an output from such a transducer that is consistent with the digital signal provided. Such digital signals may be provided by one or more control systems, including for example centralized and/or distributed systems. In some embodiments, such a signal may be generated in response to feedback information, provided at least in part, by the operation of a transducer arrangement, including one comprising the transducer receiving such information. In such an example, there may be one or more control system elements associated with such an arrangement, whereby sensors may be incorporated within the digital transducer to provide localized feedback for the optimization of the transducer and/or to supply such information to other transducers in such an arrangement and/or to provide such information to one or more other control system elements.

A number of protocols for the communication of such digital information that may be employed in some embodiments, may incorporate I2S, PCM, PDM, and the like, in combination with further control and operative information sets.

In some embodiments, each transducer may be addressed for example through the specific hardwired connection to such a transducer, where the system is analog, through serialization of one or more digital components connected to a transducer element in a transducer arrangement and through one or more control messaging system to those embodiments that include distributed control system capability, such as incorporating their own control system logic controllers.

In one embodiment, each transducer is wired directly to a PCB, whereby for a small number of transducers, such as those that may be part of a human wearable set, is efficient and effective. Such an arrangement may provide signal for emission, control signals for the control of such emission (for example amplitude/timing and the like) and power for the operation of such a transducer. However, such an arrangement becomes inefficient for larger number of transducers in terms of control, logic, computation, power requirements, heat generation, physical robustness, PCB layout and space.

A basic embodiment may comprise a single control system providing a single amplified analog signal directly, though hard wiring to a transducer arrangement Some example embodiments include having a single source one-to-one for signal, and a distributed grid for power. e.g. in a theatre setting (where in some embodiments, each seat within the theatre may have a transducer), each seat can receive a discrete signal from a common amplification system (for example one located in a projection booth), whereas each seat or row of seats could be connected to their own power bus.

An example embodiment may comprise connections of control systems and transducer arrangements in the form of a pixel grid. In one embodiment, addressing and activation of transducer is handled by sending one or more signals to a transducer arrangement where the transducers comprising such arrangement are organized on vertical and horizontal axis (for example as x-y pairs). In some embodiments, such pairs may be addressed singularly, collectively or in any combination thereof. Such an arrangement may be suitable for a theatre or other venue where the control of sets of transducer arrangements may include for example sequential or other area based triggering of such transducer arrangements.

In some embodiments activation of one or more transducers is independent of the physical layout, location or other organization of the transducers forming such an arrangement. For example, addressing and activating such transducers may include:

"Daisy chain and/or tree, sequential": Daisy chain or tree topology where addressing and activation, by one or more control systems is undertaken in a predetermined sequence, which may incorporate the absolute or relative position of a specific transducer as a node in daisy chain or tree, where such position is physical and/or logical.

"Daisy chain, tree, peer to peer and/or random, addressed": Daisy chain, tree, peer-to-peer and/or random topology where addressing and activation by one or more control system is undertaken through addressing of each transducer in a manner determined by such control systems. Such control may be undertaken through the processing of one or more sets of specifications, which in some embodiments may be dynamically created.

"Self-Sensing, relative": In some embodiments, within an arrangement of transducers, one or more transducers can determine their location (either physically or logically including within a specific address and/or name space) in relation to other transducers within the same transducer arrangement. Configuration and operation of addressing and activation by one or more control system is undertaken through, for example, by either (a) All transducers receiving the same signal and then individually determine what signal to activate based on their relative (physical and/or logical) position in such a transducer arrangement or (b) Each transducer receiving a different signal depending on the physical and/or logical positions of such transducers within such transducer arrangement "Self-sensing, absolute": In some embodiments, within a transducer arrangement, one or more transducers can determine their location (physical and/or logical) relative to one or more criteria, e.g. triangulating relative to the position of beacons or transmitters. This may include for example determining their relative position to a set of loudspeakers that such transducers may interoperate with. Transducer arrangements may be capable of receiving and interpreting signals emitted by a beacon, such as for example an ibeacon, and/or determining their position relative to a router or other device which is at a fixed and known position. In some embodiments, a transducer arrangement may include a microphone or other sensor capable of receiving a signal emitted by, for example one or more speakers, such signal then interpreted so as to determine the relative time alignment of the transducer to the speakers. Such a signal emitted by such speakers may incorporate a time stamp of the exact time of transmission, which will be used by transducer arrangement to determine the time difference between emission and reception. Such sensor may also provide phase angle information that is derived from the emitted signal and as such transducer arrangement may be able to calculate the relative position of such arrangement to the one or more loud speakers emitting such signals.

In some embodiments, portions of the control systems 600 may be located in any combination of the following non-limiting situations: (a) in a transducer (b) in a transducer arrangement (c) in or attached to a seat 100 with a transducer arrangement installed within or attached (permanently or temporarily) to such a seat 100 (d) within a vehicle that contains seats with a transducer arrangements installed in those seats (e) in a network that is connected to a transducer and/or transducer arrangement (f) in a cloud computing arrangement that communicated with one or more transducers and/or transducer arrangements (f) in an application that may be hosted on a mobile device, such as a smart phone, tablet and the like (g) in a device specifically designed to interface to one or more transducers and/or transducer arrangements.

System Identification Step

If transducers are connected in any scheme (e.g. different network topologies as well as different enumeration techniques), the system can go through some procedure to test and determine its physical location and or physical response characteristics.

For a system where the transducer array is centrally controlled in a tree topology, this procedure can entail sending a known signal to the transducer array in a random or ordered sequence and using either using passive or active feedback mechanisms in surrounding transducers to identify location and/or response characteristics of the transducer. The DSP can then be utilized to compensate for the physical location and response characteristics of the transducer.

For a system where the transducer array is centrally controlled (no matter the topology e.g. tree or daisy-chain), this procedure can entail sending a known signal to the transducer array in a random or ordered sequence and using either using passive or active feedback mechanisms in surrounding transducers to identify location and/or response characteristics of the transducer. DSP can then be utilized to compensate for the physical location and response characteristics of the transducer.

For a system in which the transducer array is not centrally controlled, this step can be used to enumerate transducers.

Transducer Operative Transformations

A transducer arrangement may comprise a set of transducers that are initially configured to be in a passive or active state. For example, a transducer may have a state, for example passive, active, sensor, emitter, whereby the transducer operating conditions are determined by one or more control system messages.

For example, a passive transducer may not be either sensing or emitting, however it may be configured to respond to an incoming control signal that changes the operating state of the transducer. Examples may include, packets, pulse, audio, electrical or other signals that are recognized by the transducer, depending on that transducers capabilities.

An active transducer may be functioning as a sensor, emitter or a combination thereof such that the operating sensor is communicating with other transducers and/or control systems in one or more arrangements. For example, a transducer may be providing sensor information to other transducers in proximity to that transducer. For example, the recipient transducer may then use such information to vary one or more characteristics of its own operations. For example, a transducer may use back EMF for sensing whilst emitting an output based on the controls and input signal received by such transducer.

A transducer operating as only a sensor may be sensing the environment of which it is a part, including the emissions of other transducers with which it forms a transducer arrangement. In some embodiments, such a sensing transducer may be used to sense the environment, such as a vehicle cabin for low frequency road or other noise, for detection of bass or other low frequency emissions from other emitters (for transducers, speakers and/or the like).

In some embodiments, a transducer may have an integrated capability to receive as part of and/or independent of, an incoming signal for emission, control signals comprising instructions to vary the state of such transducer in or more operating conditions.

Transducers may, for example, use information sets generated by those transducers and/or provided by other transducers and/or control systems to dynamically determine one or more operating conditions for that transducer within the context of a transducer arrangement. For example, if the control systems specifies one or more limitations in the overall output level of a transducer arrangement one or more transducers may adjust their specific output levels so as to remain below such a set limit. Some transducer arrangements may vary their operations to remain with other control system or other specifications, for example temperature, output levels and/or types (including frequency distributions), energy consumption and/or other specification sets.

One or more transducers in a transducer arrangement may dynamically vary their operating characteristics in response to their specific operating contexts. For example, if a transducer through one or more sensors and/or thorough one or more communications, determines a condition that may lead to a fault, then such transducer may vary its operating characteristics to avoid such a situation, for example if an excess of heat is generated, or energy consumption exceeds a specified level and the like.

One or more transducers may determine their relative position to other transducers in an arrangement through the use of one or more sensors, including the transducer acting as a sensor itself. For example, if a transducer receives a signal that creates a displacement of the transducer of N, and such a signal is sent to other transducers in an arrangement, then one or more sensors may determine the distance and angle of another sensor through the amplitude and phase of the received output of those transducers. In this manner an alignment of the complete transducer arrangement may be accomplished through applying a set of test signals to the arrangement and having each transducer vary its output such that the overall response of the arrangement, for example as frequency and phase may become coherent at the one or more points of reception by one or more users. Such an approach may be used when, for example, the transducer arrangement is combined with traditional loudspeakers or headphones.

Sensors

In some embodiments a transducer arrangement may include and/or communicate with one or more sensor sets, such as sensors 690. A sensor can sense changes in the environment and generate an output sensor signal that is indicative of the sensed changes. These sensor sets may included within the transducers themselves, where the physical and/or electrical characteristics of these devices are used to sense their environment. In some embodiments, the transducer device may also incorporate one or more sensors, such as accelerometers, temperature gauges, strain gauges and the like and one or more micro controllers, such as for example an ARM MCU or similar, whereby the transducer may sense its own operations and the environment in which it is located. Such sensor enabled transducers may in some embodiments be labeled as:

Active sensing transducers—those with control systems and sensors incorporated into the transducer, including the transducer acting as a sensor itself Control enabled transducers—those transducers where the transducer is acting a sensor itself, with an integrated MCU Sensing transducers—where the transducer acts as a sensor itself and integrated with external control one or more systems Independent sensors—where the sensors are mounted independently of a transducer arrangement and associated VTM. Such sensors include those that may monitor the environment in which the transducer arrangement is located, and may include for example, sensors that monitor the inputs to and outputs from a transducer arrangement.

In some embodiments, an active sensing transducer may include one or more sensors, control systems and patterns integrated with the transducer arrangement so as to form a single device. An active sensing transducer, in some embodiments may incorporate the features and capabilities of the Control enabled and Passive transducers.

In some embodiments, control enabled transducers may incorporate one or more control systems which may comprise one or more MCU 610, DSP 620 (including one or more control instruction sets, some of which may form, in whole or in part a Pattern) Digital to Analog converter, Analog to Digital converter, storage means (both transient and persistent), memory, network communications, security capabilities (e.g. firewalls, secure certificate storage and the like), feedback controllers and appropriate supporting firmware and software to support the API offered by such a device. A control enabled transducer, in some embodiments, may incorporate the features and capabilities of Passive transducers.

Each transducer in a transducer arrangement may act as a sensor utilizing the inherent characteristics of such transducers. For example, these may include:

Magnet displacement
Back EMF
Capacitive
Resistive
Current measurements
impedance Each of these capabilities is described herein.

Magnet displacement—In some embodiments, the pressure exerted on a VTM that is part of a transducer arrangement, for example that exerted by a user sitting in a sets, may be detected by the movement of the magnet within a transducer. Such information may then be evaluated in terms of pressure to calculate, for example, the mass of such an individual or a car sets or similar. The natural tension of the suspension rings may cause such detection to only occur once a sufficient pressure to overcome their stiffness has been detected. In some embodiments where such suspension rings may be electrically activated, there may be differing stiffness such that prior to the operation of the transducer a more sensitive pressure detection may be undertaken.

Back EMF/Inductive—In some embodiments, as the magnet mass moves around the voice coil, there is a voltage drop caused by magnetic field induced on the voice coil. This is the voltage generated by electromotive force in the opposite direction to the current that induces it. The voltage drop can be measured and used in our feedback loop.

Capacitive—In some embodiments, capacitive elements can be placed on parts of the transducer—e.g. one terminal on the static enclosure 520 (in FIG. 5), another terminal on the moving magnet 504 (in FIG. 5) and as such the capacitance changes with motion of transducer (change in distance between plates). This change in capacitance can be used in control systems including active feedback loops.

In some embodiments, transducers may be configured to be passive, in that they do not accept any control system inputs for the generation of outputs (Some Active sensing transducers and CET transducers may still monitor for incoming control commands that change their operating state, for example form passive to active or vice versa). For example, in a transducer arrangement, some transducers may have their state changed from active to passive, so as to respond to, for example active feedback or to optimize a specific audio/tactile experience.

For example, when sensing a user in seat through a transducer arrangement an embodiment may employ the following steps:

i. Output one or more known signals (for example, sine sweep, pink noise)
ii. Measure response and store for that user
iii. Improve and reduce error with multiple trials
iv. Improve reliability of detection and reduce error with using other sensors present in car (e.g. optical, HRM, pressure map on seat)
v. Output known signals on one transducer and measure on others, loop through transducers In some embodiments, the transducer control system 600 may incorporate one or more feedback mechanisms from one or more sensors 690, which in part may determine the configuration and operation, by one or more transducer control systems 600, of the transducer arrangements.

In some embodiments, the optimization of a desired frequency response, within a closed loop feedback system may incorporate:

i. Taking one or more sensor inputs from sensors 690
ii. Measuring and evaluating differences between desired (for example for an optimal experience) values and the measured values
iii. Undertake one or more actions, for example through control systems, to minimize the impacts of the measured and evaluated differences, thereby affecting the transducer control signals 650, 652, 654, 656 provided to the transducers.

In some embodiments, such processing can be combined with multiple sensors 690 of the same type and of different types so as to improve reliability, and potentially utility, of such sensor data.

In some embodiments, the transducer control system 600 may undertake additional processing, such as determining the degree of variance from an intended, and potentially optimized set of outcomes from such a transducer arrangement. For example, error ratios, percentages or other measures may be employed in such calculations, so as to configure control system operations so as to manage transducer arrangement outputs and/or other operation parameters (for example heat generation, power consumption, frequency cut offs and the like.) This may, for example include adaption or other modification of one or more algorithms employed by such control systems 600, including coefficients in such algorithms, so as to optimize performance and/or minimize discrepancies between desired and measured values, in an iterative and dynamic manner.

Figure 7:
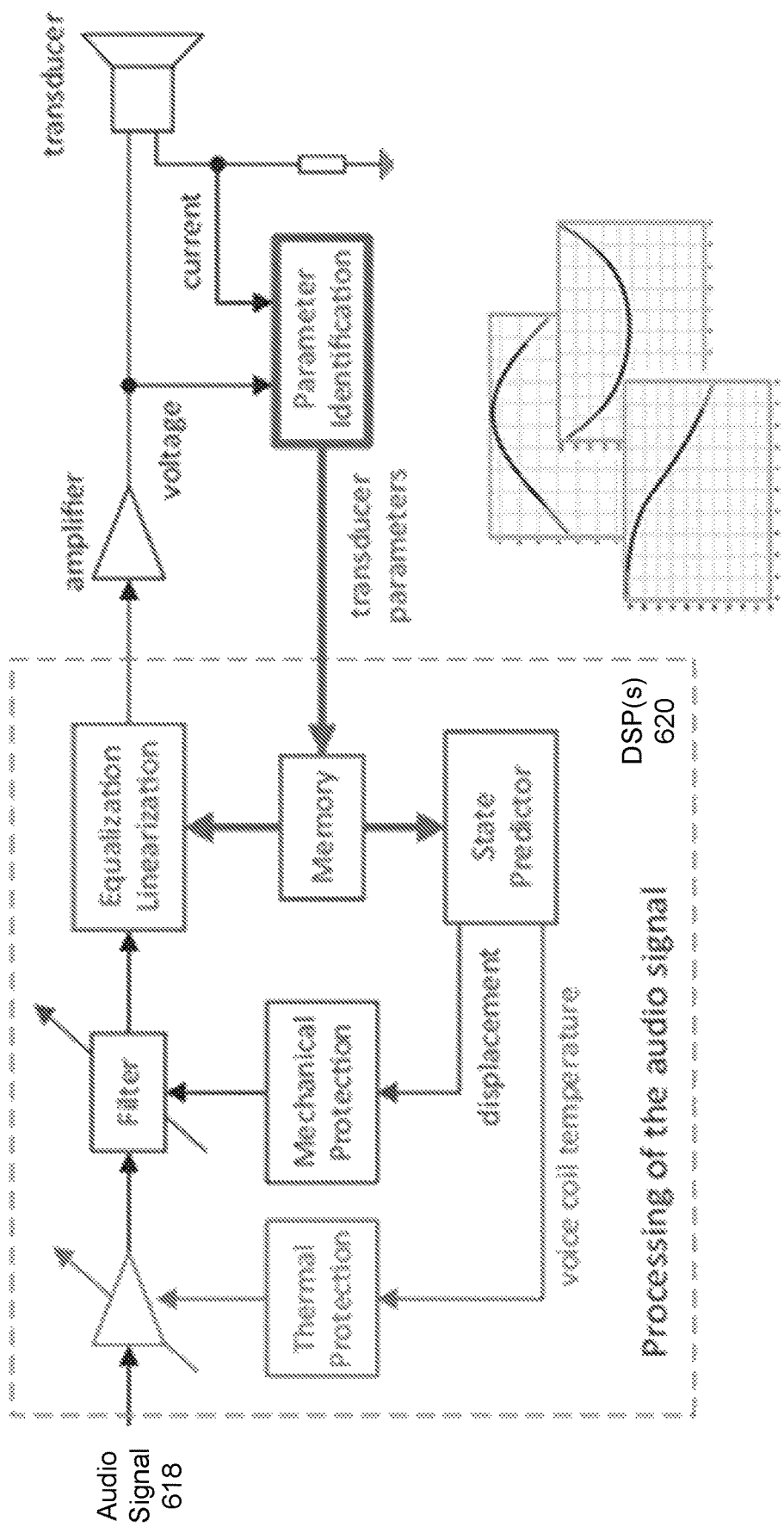
FIG. 7 illustrates processing of an audio signal in a DSP of a transducer control system of FIG. 6, according to an embodiment.

For example, FIG. 7 illustrates processing of an audio signal in a DSP of a transducer control system of FIG. 6, according to an embodiment. A sensed voltage and current of the transducer are used to identify transducer parameters. A state predictor can determines a voice coil displacement and a voice coil temperature. If the voice coil temperature is too high, thermal protection is applied by reducing a gain of the audio signal 618. Similarly, if the displacement is too high, mechanical protection is applied by reducing a gain of the audio signal 618. Equalization can also be applied to the audio signal 618.

In some embodiments, sensors 690 proving such information sets may comprise one or more of:
- acceleration
- position
- orientation/gyro
- pressure (e.g. force/load/strain)
- temperature
- proximity
- optical
- electrical
- mechanical
- heart-rate
- pupil/gaze tracking Some embodiments may employ one common feedback mechanism, which is the PID Controller (Proportional Integral Derivate Controller).

In some embodiments, biofeedback may be used. The transducer arrangement may include one or more sensors 690 which provides information to one or more controller units, where such information may vary the operating conditions, including input signals, for such transducer arrangement. In some embodiments, there may be one or more devices that are independent of a transducer arrangement, where such devices include one or more sensors 690. Information sets generated from such sensors may be incorporated into controlling operations of a transducer arrangement, for example such as providing feedback information as to the environment and/or biofeedback from a human. For example, a human wearing a suitable device, such as a smart watch, where such a device has, for example a heart rate monitor and information generated by such a device may then be transmitted to a transducer arrangement control system, such that for example the volume, frequency or other performance characteristic of the transducers is modified. For example, in the example of a transducer arrangement embedded in an automotive vehicle seat occupied by the driver of a vehicle the intensity of the operation for the transducers may be decreased if the heart rate of the human driver increases above one or more thresholds. In some embodiments, such feedback may include for example:

Posture—measurement of posture and context through activation of one or more transducers in a transducer arrangement, transmission of such generated signal though human and capture of such signal by one or more sensors 690. In some embodiments, such sensor(s) may be part of transducer arrangement. Such posture information may be used to trigger an event or alert, for example if the human slumps forward, suggesting unconsciousness, tilts their head back, suggesting a micro sleep or other posture that may not be suitable for that human. In some embodiments, such posture which suggests sleep may be advantageous, such as for passengers on long journeys, and consequently other events, such as removing stimuli, changing lighting conditions, turning off screens or similar may be undertaken.

Direction of sight—In some embodiments, the turning of the head of a human may be detected and one or more events and/or alerts may be generated.

Human identification—Each human may be determined individually through a combination of transducer arrangement activations resulting in low frequency signals that are absorbed, reflected and refracted. When combined with other transducer arrangement capabilities, such as pressure measurement (both direct and indirect), multiple human identifying characteristics can be determined, such as body mass index, gender, and the like. These characteristics may be combined with transducer arrangement sensor capabilities, such as accelerometers, GPS, heart rate monitors, galvanic skin response sensors and the like to create an identifier for a specific human. In some embodiments such parameters sets may be used to customize seat for a type of human rather than a specific human, for example where the host seat is part of a public location, for example a cinema.

In some embodiments, a transducer arrangement may be used, in whole or in part, to calculate the G forces that a human positioned in a seating arrangement that includes such a transducer arrangement may be experiencing or may have experienced.

In some embodiments, a transducer arrangement may be provided with a signal source from one or more sensors (for example those placed in an environment, such as a car cabin, bus cabin, airplane cabin and the like), such that the input signal received from such sensor set is inverted so as to be out of phase, with the incoming signal. This signal may be processed by one or of digital signal processors 620 so as to extract from such signal any underlying repetitive low frequency vibrations. When such a signal is applied to a transducer arrangement in contact, for example through a seat that includes a multipart membrane, the effect will to, at least in part null the vibrations experienced by a user through or audio and/or tactile transmission. For example, such an approach may be employed to reduce the impact of such an environment for noise cancellation purposes, for example that is experienced during road, rail or air travel.

Such contra phase signals may be created from one or more environment sensors which monitor a specific environment, such as a room, airplane cabin, car cabin or other enclosed space.

Some embodiments of an electroactive transducer can comprise an integral active feedback system; preferably with an integral amplifier. More specifically, the active feedback system comprises one or more of position, orientation, force, load, temperature, pressure, proximity, optical, electrical, and magnetic sensors; and an active feedback loop using the sensor input to control the signal going to the amplifier and the electroactive transducer to provide an optimal frequency response.

Sensor Combinations

In some embodiments, transducers may operate as active and/or passive sensors, such that in a transducer arrangement, one or more of the transducers may operate to generate information sets that may be used by transducers in a transducer arrangement (including that transducer) and/or other systems capable of communicating with such transducer arrangement. Such sensor information sets may be managed by one or more control systems, where the operations of both sensors and transducers may be modified by such control systems instructions in accordance with information comprising such information sets. For example, if a sensor (e.g. a pressure sensor) detects that person has removed themselves from a seat that includes a transducer arrangement, the control systems may terminate or make quiescent the operations of the transducers. If for example a different person positions themselves in that seat, the control systems may initiate a set of processes to determine the characteristics of that person (for example weight) and adjust the output characteristics of the transducer arrangement so as to match those characteristics. For example, this may include optimizing the sound experience based on BMI or other physical attributes.

In some embodiments, transducer arrangements may be located in multi person seating, where for example on a sofa, bench seat and the like. For example, such a seat may be arranged such that multiple people may sit (or recline) in an environment where transducer outputs may be used for example, to compliment a listening or video/audio experience (which may include for example AR and VR experiences).

In such an example embodiment, such a seating arrangement may include one or more transducer arrangements that may be controlled to localize differing outputs for individual persons on such a seating arrangement. For example, transducer arrangements and/or other sensors (e.g. pressure sensors), may provide information to one or more control systems that indicate the number and orientation of the persons on the seating. This may for example also be accomplished through an application, for example hosted on a smart phone, that provides such information.

Control systems may then, in response to this information and potentially to other inputs, may then instruct such transducer arrangements to produce outputs that match the number, orientation and characteristics of the persons on such seating, that is complimentary to the experience that such persons are undergoing. For example, if there are three persons sitting vertically aligned, and for example playing a video game where each has a controller and an on screen persona, control systems may generate appropriate outputs that complement the actions of those personas in the gameplay.

In another example if there is a couple lying on the sofa watching movie, the control systems may generate outputs that are in alignment with the movie being shown, which may include orienting the outputs of the transducers such that there is more output generated for the upper body rather than the legs.

In some embodiments, such distributions of transducer outputs may be controlled, in whole or in part, by an application, for example on a smart phone, tablet, remote control or other similar device, where each participant may adjust such transducer output for their specific preferences.

In some embodiments, such preferences, for example physical characteristics, may be captured and/or imported, for example using scales for weight, "fitbit" for other physical data, data entry for height, personally selected preferences, for example levels of output, transient response, attack and decay functions, low frequency cut off, filer roll off and other such transducer arrangement controls may be presented to the user through, for example, an application that expresses these controls in terms more familiar to the user, such as for example:

Level (low to high)—Level of output
Speed (fast to slow)—Transient response and attack and decay combined
Bass enhancement (low to high)—Level of bass lift/cut
Bass smoothness (low to high)—Low frequency cut off and filter characteristics In some embodiments, linear (for example, Movies, TV shows and music) and non-linear (for example Games) experiences may be complimented by additional control system information sets that are synchronized to and/or generated from those experiences. In some embodiments, events in these experiences may be used as triggers for specific control systems operations. For example, "jump scare" impact—where if the movie has a segment that has a "scare" the transducers may generate an output in synchronization with such a "scare" to emphasize that moment.

In some embodiments, such control systems information sets may be preformatted and be triggered by, for example, information in the video and/or audio elements of the linear and non-linear experiences. For example, and explosion in a movie may be detected as such as enhanced though activation of one or more transducer arrangement in a manner that is compatible with such an effect. Such detection may be triggered by the audio soundtrack or other signal associated with such a movie or detected by a control system analysis of such signals and/or outputs from a speaker system that is originating that sound.

Patterns

One key aspect of the embodiments described herein are patterns that provide input to the control systems that manage transducer arrangements. These patterns may be combinations of specifications and/or signals that when applied to an appropriate control system enable that system to create one or more outcomes from a transducer arrangement.

Patterns may cover specific contexts, such as the operations of a transducer arrangement in a seat, where for example a Pattern may include specifications for monitoring the operation of such a transducer arrangement so as to prevent that arrangement from performing outside the performance parameters specified in such a pattern.

In some embodiments a typical seat based transducer arrangement may incorporate a set of patterns, for example those focused on transducer performance, tactile feedback, audio system optimization, user personalization, health and wellbeing, biofeedback, directional indications, alters and events and/or any other appropriate transducer arrangement and/or sensor systems specifications.

Patterns may be deployed both locally as part of an integrated transducer arrangement, for example a pattern may be stored in a hardware element accessible by an MCU. Patterns may also be deployed within a specific environment, for example a vehicle or theatre, and dynamically employed by one or more control systems in response to, for example other patterns specifying such deployment, a user selection or input, active feedback or other transducer control system instructions and the like. Patterns may be dynamically deployed for, for example, a cloud based system, where for example is a user is seated in vehicle A, the appropriate pattern for that that user may be employed by the control systems of the transducer arrangement operating in vehicle A and when the same user moves to Vehicle B, the pattern may be deployed to the control system of the transducer arrangement in vehicle B. In some embodiments such management of such patterns may employ one or more security features, such as encryption and digital certificates so as to ensure that the pattern specifications are not available to unauthorized users or control systems.

Patterns may also be composites of other patterns whereby a pattern may consist of a series of other patterns and specifications determining their configuration and employment by one or more control systems for one or more transducer arrangements.

Transducer Reliability and Operational Performance

In some embodiments, the performance and operation of the transducer arrangement in an optimal and safe manner may be specified by a pattern. This pattern may for example include:

- Dynamic auto-equalization of the transducer arrangement within the specific physical context, such as a seat, vehicle and the like to give desired frequency response
  - Optimization of the tactile experience from a transducer arrangement and associated system elements is the result of a complex interaction within a system consisting of human, SubPac, seat and environment
  - Frequency response may be optimized for a specific person or may represent a specific persons preference, for example a specific artist, producer and the like.
- Over-heating prevention: For example, if a transducer is overheating, through for example sensing of the temperature of the transducer and/or transducer surroundings, one or more control systems may for example, lower one or more input signals levels to such transducer(s) or temporarily remove such input signals, effectively returning the transducer to at rest state. In some embodiments this may involve, one or more temperature sensors on voice-coil, membrane or other transducer elements and/or sensors for back EMF/current feedback from voice coil, which may then be evaluated through for example one or more thermal models in a DSP. Alerts of such conditions may be provided to users and/or to one or more control systems, including for example a control display system such as that for a theatre where there are multiple seats fitted with such transducer arrangements.
- Pressure: if too much force is exerted on the transducer, input signals may be reduced or terminated so as to temporarily shut down the transducer and/or alert user
- Over-excursion prevention: one or more accelerometer sensors may provide information that when evaluated by an appropriate control system, including in some embodiments a DSP configured for such evaluation, that may be part of a digital or analog transducer arrangement, may cause if such excursion is evaluated to be above pre-set of a dynamic threshold, cause one or more input signals to be attenuated so as to prevent such an excursion. In some embodiments, such evaluation may be undertaken prior to provision of the signal to the transducer, for example as a limiting function on such input signal and/or may be undertake as part of an active feedback network involving a transducer arrangement.

User Alerts Pattern

In some embodiments, the performance and operation of the transducer arrangement in an optimal and safe manner may be specified by a pattern.

This pattern may for example include a tactile alert. In some embodiments, a system can receive digital information not directly transferable to an analog signal for the electroactive transducer, for example, acceleration information over, for example, an OBDII interface or a control signal to activate one or more specific user alerts. For example, such alerts may comprise, in whole or in part, an information set suitable for triggering the generation of audio and/or tactile output that is intended to convey to a user a situation that requires their attention, such as for example a collision avoidance alert, an indication of stopped traffic ahead, an indication of the presence of emergency vehicles and the like.

Such an information set may include instructions that includes temporal information, for example such one or more information sets, may indicate urgency, distance or other such parameters. The temporal information can be used to vary, for example, intensity, volume, frequency, pulse duration, pulse frequency and the like of generated tactile and/or audio outputs.

In some embodiments, one or more control systems comprising at least one computer and/or logical processing unit can use such information sets to generate one or more control signal sets to activate an electroactive transducer arrangement.

The pattern may implement a rabbit effect. In some embodiments, the activation of transducers is timed in such a way to achieve the illusion of there being a transducer in a site between two transducers. In some embodiments further utilizing this illusion, the activation of transducers is timed in such a way that, instead of perceiving discrete taps corresponding with the actual sites of the transducers, the user perceives a continuous swipe along the activation of various transducers. This is similar to sensory saltation effect described in literature where a similar illusion is created on the forearm with haptics actuators.

In some embodiments, such user alerts may be generated so as to be tactile, auditory and/or visual in any combination. For example, typical alerts may, in some embodiments convey to one or more humans, the following alert types:
  i. caution/inform pilot/operator to take over control
  ii. collision avoidance alert
  iii. blind spot alert
  iv. lane departure alert
  v. navigation cues
  vi. hello/welcome/goodbye
  vii. Landmark or point of interest alert
  viii. Time to destination or other pre-set temporal alert
  ix. Sleep state (including micro sleeps) or other alert (for example to another human in the same environment)
  x. Other biometric based alerts
  xi. And/or the like.

In some embodiments, tactile portions of these alerts are presented via one or more tactile effects. For example, one or more of these tactile effects can be configured to each user alert, for example from those outlined herein.

For example, some example embodiments for tactile effects is presented where the electroactive transducers are activated individually are described herein. In some embodiments such activations may comprise a sequence, such that a set of transducers is activated to provide an alert or other event notification to a human user. In one such embodiment, an individual electroactive transducer is activated for a certain period of time and turned off until the next alert; or this is turned on and off for a single alert via periodic or irregular pulses.

Figure 8A:
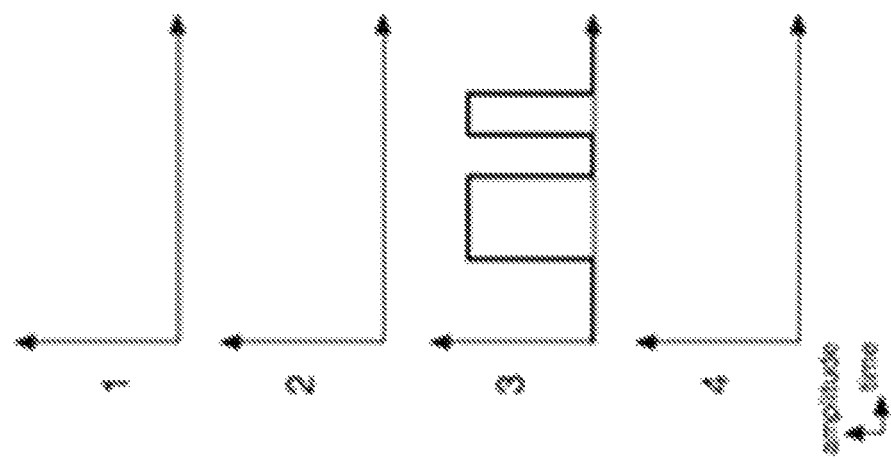
FIG. 8A-8C illustrate the activation of transducers, according to different embodiments.
Figure 8A:
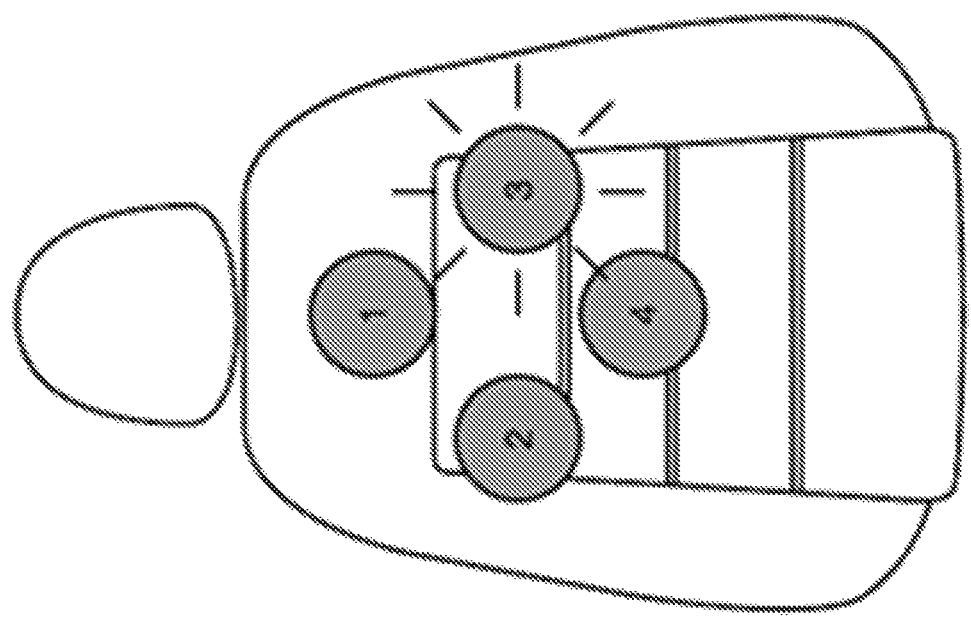

FIG. 8A illustrates the activation of transducers, according to an embodiment. In FIG. 8A, transducer number 3 is activated, which causes it to vibrate. For example, this could indicate the presence of an object (for example another vehicle, bicycle, small child and the like) in a blind spot.

Figure 8B:
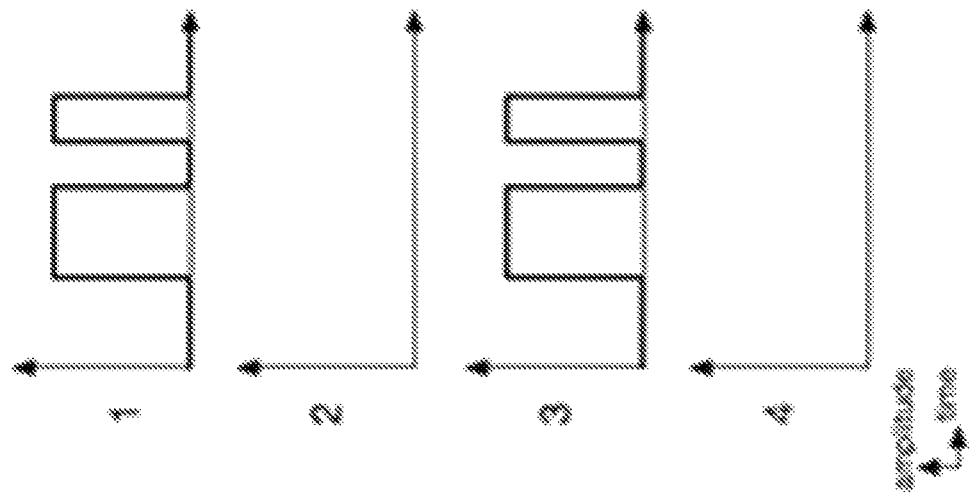
Figure 8B:
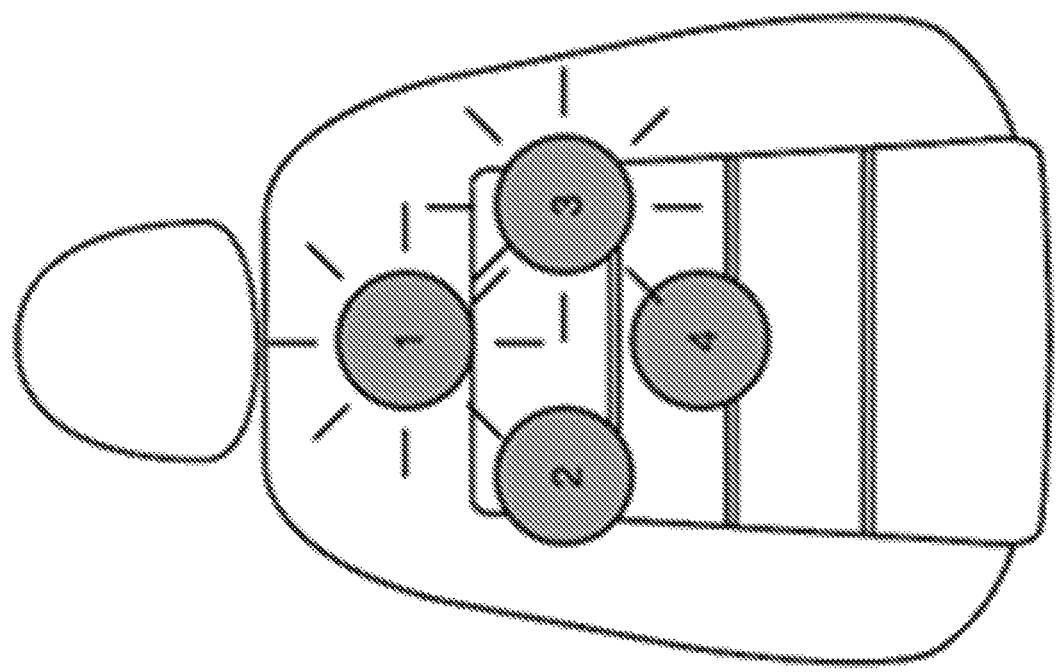

FIG. 8B illustrates the activation of transducers, according to an embodiment. Two or more electroactive transducers 1 and 3 may be activated together. For example, such two or more electroactive transducers can be activated together for a certain period of time and turned off until the next alert; or these are turned on and off for a single alert via periodic or irregular pulses. For example this may be a prompt for a user to undertake a turn and/or respond to a navigation alert.

Figure 8C:
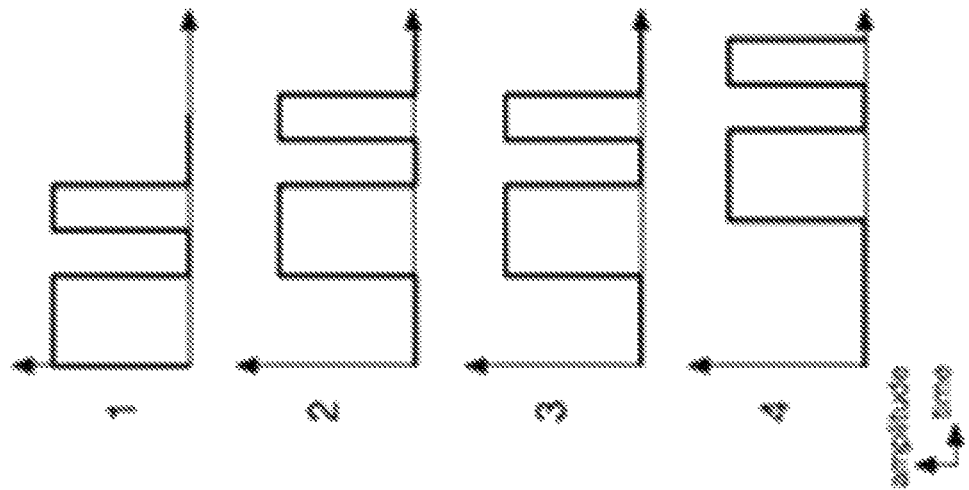
Figure 8C:
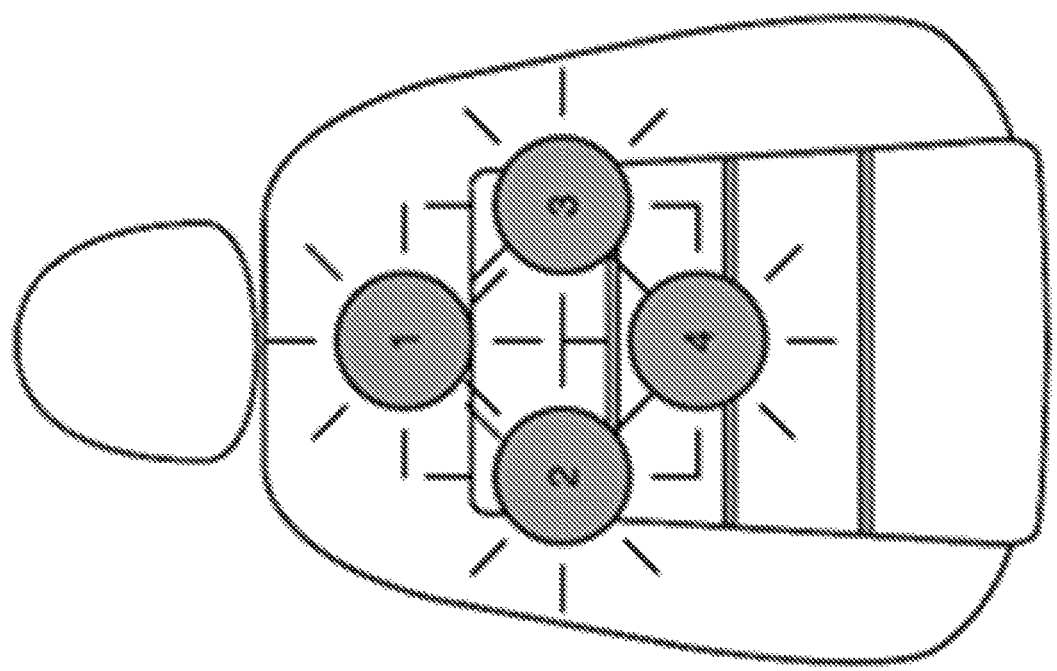

FIG. 8C illustrates the activation of transducers, according to an embodiment. Two or more electroactive transducers are now activated in a staggered manner. In this embodiment, two or more electroactive transducers 1, 2, 3 and 4 are activated for an alert where periodic or irregular signals are sent to individual transducers with a delay between activation for each transducer. For example, this arrangement may provide a stimulus to a driver who is sensed to not being attentive to their situation.

In some embodiments, each transducer may be activated so as to generate one or more outputs at one or more frequencies, individually and as part of an arrangement. Such activations may be configured by one or more controllers, for example a CPU, associated memory, persistent storage and appropriate specifications.

In the example of FIG. 6, such a sequence may carry an information alert that is recognized by a human, such as an indication with variable intensity, that there is an event occurring to which human may respond or be alerted to that is coincident with that specific sensor. For example, if there was an obstacle, such as another vehicle detected by one or more sensors, for example Radar, Lidar or other proximity sensing capability, the human may be made aware of such proximity through the transducer providing tactile, visual and/or audible feedback, such as alerts. For example, an embodiment may track proximity of one or more objects such that the intensity of the feedback/alert is proportional to the distance of the object, such that the closer the object the more intense is the feedback/alert.

In some embodiments, triggers from media sources that are inaudible but trigger specific reproductions in array of transducers, for example an explosion/earthquake or other dramatic effect, a low frequency rumble such as an approaching heavy vehicle or similar, where such an event is not yet (or potentially ever) visually represented.

In some embodiments, body movement may be simulated by activating, for example, one transducer on a side to emphasize a specific event, action, visual effect and/or the like.

Additional Patterns

In some embodiments arrangements of transducers may for example be integrated into physical seating, such as seats in an auditorium or similar venue, and such seat based arrangement s may be activated, for example in waves, where for example a row of seats (say row 1 out of 20) is activated, then row 2, row 3 and each subsequent row. In some embodiments, the intensity of the activation may be constant or vary, and may include both audible and tactile activations.

In one embodiment, the patterns are environment compensation patterns providing disturbance rejection. In some embodiments, control systems may evaluate one or more inputs so as compensate for external disturbances, for example: (a) Low frequency, low g (acceleration/deceleration when in moving vehicle) (b) Impulsive, high g (impact, shock, bump) (c) Periodic, medium g (dancing) (d) and the like.

In some embodiments such inputs may be provided by sensors that are part of the transducer arrangement, sensors external to such arrangement and/or separate external systems.

In one embodiment, the patterns are health monitoring and tracking patterns. For example:
  Use of one or more sensors to determine body fat content (for example BMI). It can be used to authenticate and/or monitor and track an individual's health
  May be combined with HRM to determine user excitement/stress/drowsiness level and use tactile response to modulate these indicators. In some embodiments this may form part of a second order feedback loop.
  May provide anxiety and stress level detection and/or remediation
  May incorporate user attention tracking Application Domain Examples Although each of these example application areas described below has some specific advantages as described herein, these advantages can be applied to any implementation of a system, subject to any physical limitations of the context of that implementation, including for example those in cars, other vehicles (for example buses, trains, trams and the like), airplanes, ships and other non-mobile installations, such as theatres, concert halls or other venues, theme park installations, home settings (for example gaming seats, couches or sofas connected to home theatre systems or other domestic furniture), clubs, offices, professional venues and/or the like.

In cars, subwoofers take up a lot of space, have high power requirements and cause undesired rattle in chassis. Embodiments described herein can provide superior bass response with less energy consumption and can be space neutral as the transducer arrangements can be incorporated into the vehicle seats.

The system can provide fade audio/alert: when an alert is generated when music is currently playing, a transducer arrangement generating the bass component of such music can be temporarily faded, as can the headphones providing the upper components of such music, and/or filtered to differentiate and accentuate alerts.

The system can provide a combination of tactile alerts with audio and visual alerts. To improve discernment and differentiation of alerts, tactile alerts can be combined with other types of alerts.

For spatialization, multiple transducer arrangements that enable surround-sound type tactile experiences.

The system can provide an individualized per user experience in vehicles, such as cars (including car sharing/car hiring services) and/or multi-passenger vehicles. For example, an individual persons profile may be captured and stored in one environment, for example their own car and securely transferred to another seat when applicable, for example another car, train, airplane or similar. One or more control system may integrate with other seat specific information associated with the transducer arrangement installed in that seat, to optimize the experience for that specific user The system can provide tactile communications through generation of one or more patterns which includes one or more mechanical representations of sensations and events. These may include one or more:
  Patterns for warning
    Patterns to warn drivers and/or passengers of hazards
  Patterns for informing
    Patterns for informing drivers and/or passengers, e.g. navigational cues, wake up when nearing/reaching destination Patterns for informing passengers of impending impact and advising to adopt a brace or other protective position to minimize the impact.

Patterns for comforting

Patterns for massaging, soothing or putting passengers to rest or sleep

All of the above may be individualized per user experience in single or multi person vehicle seating arrangements.

Communications for deaf/hard of hearing and vision impaired drivers and/or passengers Detection of whether a child car-seat is installed properly, which for example may include the registration and storage of a signature of a properly installed car-seat and can provide alerts to driver and/or passenger if seat not properly installed (e.g. if it doesn't match signature or if pressure applied to transducer arrangement and/or sensors by car-seat is asymmetric)

Providing one or more alerts, through detection and evaluation by transducer arrangement and associated sensors to detect driver pose and/or posture, which may be combined with other sensors in a vehicle to determine where driver's attention is directed Vehicle vibration/road conditions may be calculated and evaluated though measurement of acceleration/g-force, gyro data and other inputs from various sensors in transducer arrangements and external sensors, such as those installed in the vehicle or on the person (s) in such vehicle Such information may be used to control and generate one or more outputs from one or more transducer arrangements to cancel/minimize perception of road vibrations Identification of a person in a seat may include detection of the presence of a living thing in seat and/or detection of a specific person in a seat. This information may be used to control and/or optimize airbag optimization and/or other external systems. The detection of a specific user in seat (which may for example include authentication, user specific controls and the like), may be combined or incorporated with vehicle black-box data, and may be used to, for example, alert driver in or more manner. (such as to direct attention to a certain direction and the like)

Biometric data for other systems

Massage and comfort

Health and wellbeing

In some embodiments seats in a multi seat venue, such as a theatre, concert hall or other performance venue, may incorporate a transducer arrangement so as to provide the low frequency and tactile elements associated with the performance. For example, in a cinema, the low frequency component of the performance, such as for example an explosion or other impact, may be communicated to a user through the output of the transducers in their seat. In some embodiments such output may be proportional to their distance from the screen, or may represent an as yet unseen entity and increase in relation to the proximity of this entity to the action on screen.

In some embodiments, one or more patterns may be used to create sensations for a person from the seating such as for example:

Wave pattern: where by those closest to a boundary (front, rear, side) of the venue receive an output for the transducer arrangement in their seat at a specified level, and then each adjacent seat (or row of seats, circle of seats or any other arrangement) receives an output at a specified level.

Rabbit pattern: In which a transducer arrangement in a seat has each individual transducer generates an output in response to a "rabbit" pattern, such that the user receives tactile and/or audio that travels in a specified direction (such as for example, up/down/left to right/right to left/circular and the like).

In/out pattern: In which the transducer arrangement provides a forward movement from all the transducers to represent the apparent forward movement, which may be gentle through to abrupt and/or may be linear, exponential or otherwise algorithmically driven. The transducer may also provide a rearward movement to represent a rearward or the effect of being "sucked into" a seat. For example, both of these effects may be used to simulate G or other acceleration/deceleration forces. These may also be combined with the rabbit effect to simulate or accentuate changes in direction.

In some embodiments a transducer arrangement may be operated through signals generated in conjunction with an interactive game, simulation or other user experience. For example, if a user is impacted by, for example a weapons blast in the game, one or more transducers may be activated so as to represent the impact of such a weapons blast (for example an arrow, bullet, axe, laser weapon, cannon, fist, kick, sword, shockwave weapons, explosives, staff, medieval weapons and/or other such impacts) and those impacts caused by movements in a game (for example a car hitting a wall), and those impacts caused by weapons and impacts on a vessel, which in the game the user is populating (for example, a ship, spaceship, tank, aircraft, rocket, car or similar). In some embodiments, some games may include the simulated movement of the human user, for example the G forces in a car racing game, the simulated forces of a rocket pack, the impacts forces of landing on a platform (or example jumping a simulated distance and the like), and as such one or more transducers may be activated to simulate such forces and impacts.

In some embodiments, for example in multi user online games, including for example network connected games, one or more transducers in a transducer arrangement that is connected to a human player so as to provide tactile and/or audio outputs, for example through a wearable and/or seat based arrangement, may be activated by the actions of another player, for example if a user hits, shoots, blasts the other user, such that the degree of damage inflicted by such an impact is represented by the activation and operation of one or more transducer arrangements.

Apparel—Clothing

In some embodiments, a transducer arrangement may be incorporated into one or more clothing arrangements, for example protective clothing worn, for example by firefighters and other first responders, motorcyclists, military personnel and others where tactile alerts may be beneficial. For example, a motorcyclist may have incorporated in their protective clothing a transducer arrangement that provides warning of another vehicle in their blindspot(s). In the situation, for example, such as a house fire where there is dense smoke and potentially limited, intermittent or no audio communications available, the firefighter may receive directions via tactile alerts/instructions (including for example directional instructions) through their clothing integrated transducer arrangement. Such transducer arrangements may include sensors such as those described herein.

Backpack

Transducer arrangements and their integrated and/or associated patterns and control systems disclosed herein may be integrated into, for example, any backpack and/or any luggage carrier that is in contact with human body.

Figure 9:
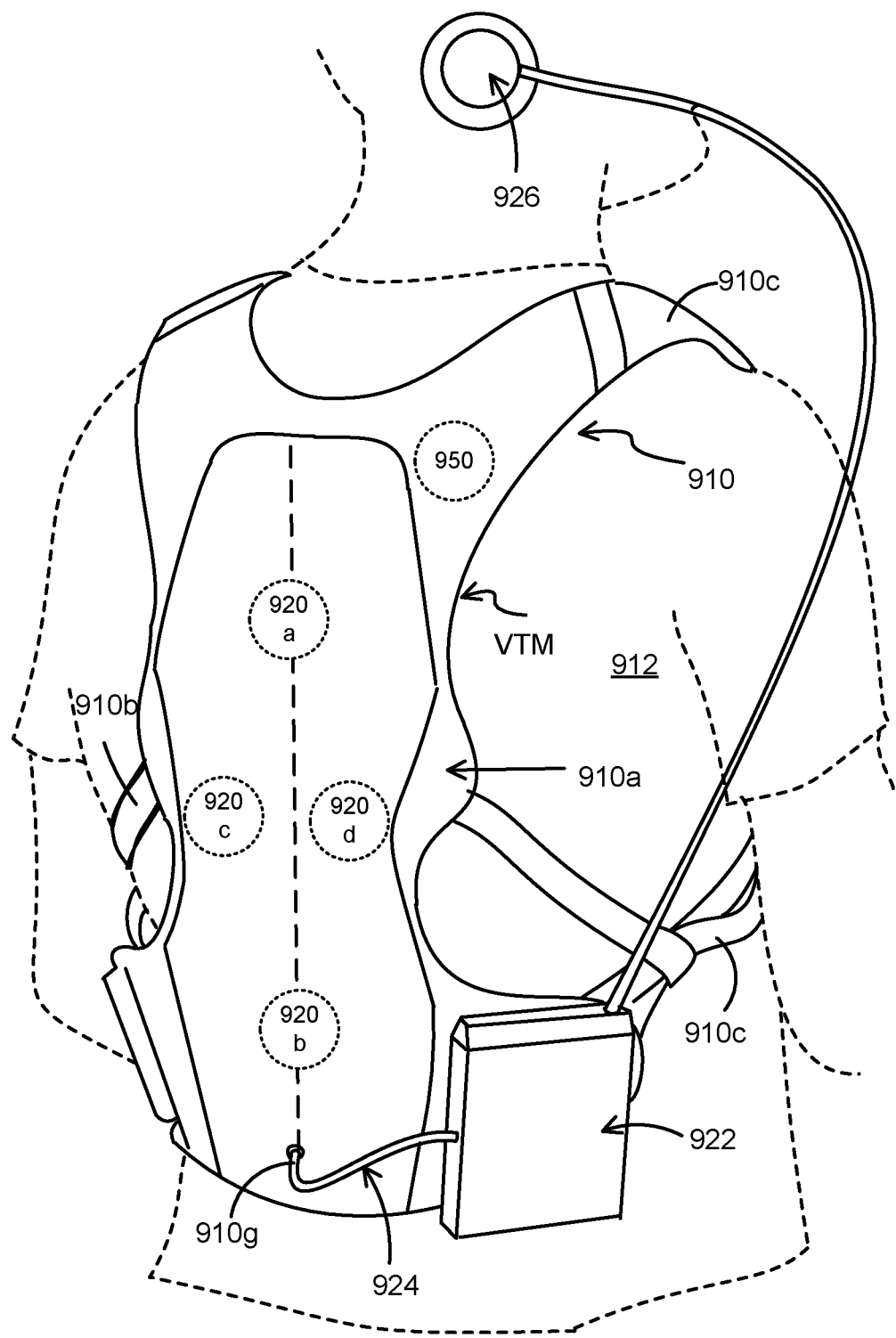
FIG. 9 illustrates a tactile sound device in the form of a wearable backpack device that is positioned adjacent a user's back, according to an embodiment.

Referring to FIG. 9, a tactile sound device 910 is illustrated in the form of a wearable backpack device that is positioned adjacent a user's back 912. Sound device 910 includes a back region 910a that is positioned proximal to the user's back 912. Straps 910b, 910c pass over the user's shoulders, wrap under the user's arms and extend rearward to rejoin back region 910a.

Back region 910a comprises an enclosure that includes but is not limited to a VTM that is able to be positioned adjacent the user's back 912. The VTM is located along a surface of the back region 910a that is adapted to face and contact the user's back 912. Multiple electroactive transducers 920 are also positioned within the wearable backpack device and coupled to the VTM. There are also one or more sensors 950 that are part of the wearable backpack device.

Two of the electroactive transducers 920a and 920b are audio tactile transducers that can convert a low frequency audio signal into vibrations felt by the user, and allow the user to experience low frequency tactile sound. The transducers 920a and 920b are located along a vertical center line 930 of the back region 910a. The vertical center line 930 can be a virtual center axis of the back region 910a that separates the left and right halves of the seat back 110 from each other. The transducers 920a and 920b are located along the vertical center line 920 so that they will align with the spine of a user wearing the backpack device.

Two of the electroactive transducers 920c and 920d are directional alert transducers that generate vibrations to provide directional cues to the user. One transducer 920d is located at the right side of the back region 910a and provides directional alerts to a right side of a user. Another transducer 920c is located at the left side of the seat back 910a and provides directional alerts to a left side of a user.

A control box 922 is selectively securable to back region 910a. Wiring 924 extends outwardly from control box 922 and into back region 910a. Headphones 926 may be selectively operatively engaged with control device 922. Control box 922 may include the transducer control system 600 of FIG. 6, which controls the transducers 920 using sensed information from the sensors 950 as previously described.

Upon reading this disclosure, those of skill in the art may appreciate still additional alternative designs for a system with transducers that provide tactile sensations. Thus, while particular embodiments and applications of the present disclosure have been illustrated and described, it is to be understood that the disclosure is not limited to the precise construction and components disclosed herein. Various modifications, changes and variations which may be apparent to those skilled in the art may be made in the arrangement, operation and details of the method and apparatus of the present disclosure herein without departing from the spirit and scope of the disclosure as defined in the appended claims.

What is claimed is:

1. A system providing tactile sensations, comprising:
a seat back of a seat, the seat back having a left side and a right side separated by a center-line of the seat back;
a first plurality of electroactive transducers arranged along the center-line of the seat back and which provide tactile sound;
a second plurality of electroactive transducers in the seat back to provide tactile alerts or feedback, the second plurality of electroactive alert transducers comprising a left-side electroactive transducer at the left side of the seat back and right-side electroactive transducer at the right side of the seat back; and
a membrane in the seat back that is coupled to the first plurality of electroactive transducers, the membrane dissipating vibrations from the first plurality of electroactive transducers.

2. The system of claim 1, wherein the first plurality of electroactive transducers and the second plurality of directional alert transducers are arranged in a diamond shape.

3. The system of claim 1, wherein the second plurality of electroactive transducers further comprise an additional left-side transducer at the left side of the seat back and an additional right-side transducer at the right side of the seat back.

4. The system of claim 1, wherein the first plurality of electroactive transducers and the second plurality of directional alert transducers are arranged in a transducer grid.

5. The system of claim 1, wherein the center-line corresponds to a location of a user's spine, and the first plurality of electroactive transducers are configured to provide the tactile sound at least partly using bone conduction via the user's spine.

6. The system of claim 1, further comprising:
a seat bottom having a left side and a right side; and
a third plurality of electroactive transducers in the seat bottom to provide tactile alerts or feedback.

7. The system of claim 1, further comprising:
a transducer control system that receives an input audio signal and generates transducer control signals for the first plurality of electroactive transducers based on the input audio signal, wherein the transducer control system also receives vehicle event information and generates transducer control signals for the second plurality of electroactive transducers response to the vehicle event information.

8. The system of claim 7, wherein the vehicle event information corresponds to a blind spot warning, lane departure warning, or a navigation event.

9. The system of claim 7, wherein the transducer control system:
filters the input audio signal into first audio content in a first frequency range and provides the first audio content in the first frequency range to an upper transducer of the first plurality of electroactive transducers via a first transducer control signal; and
filters the input audio signal into second audio content in a second frequency range different than the first frequency range and provides the second audio content in the second frequency range to a lower transducer of the first plurality of electroactive transducers via a second transducer control signal.

10. The system of claim 7, further comprising a sensor in the seat, wherein the transducer control system receives sensed information from the sensor and generates, based on the sensed information, at least one of the transducer control signals for the first plurality of electroactive transducers or the transducer control signals for the second plurality of electroactive transducers.

11. The system of claim 1, wherein the second plurality of electroactive transducers also provide tactile audio.

12. The system of claim 1, wherein each electroactive transducer of the first plurality of electroactive transducers has two suspension springs.

13. A system providing tactile sensations, comprising:
back facing surface of a wearable device for contacting a user's back, the wearable device having a left side and a right side separated by a center-line of the wearable device that corresponds to the user's spine;

first plurality of electroactive transducers arranged along the center-line of the back facing surface and which provide tactile sound;

second plurality of electroactive transducers in the wearable device to provide directional tactile alerts or feedback, the second plurality of electroactive transducers comprising a left-side electroactive transducer at the left side of the wearable device and a right-side electroactive transducer at the right side of the wearable device; and a membrane in the seat back that is coupled to the first plurality of electroactive transducers, the membrane dissipating vibrations from the first plurality of electroactive transducers.

\* \* \* \* \*